(12) United States Patent
Sugano et al.

(10) Patent No.: US 6,205,478 B1
(45) Date of Patent: Mar. 20, 2001

(54) SYSTEM FOR EXCHANGING USER INFORMATION AMONG USERS

(75) Inventors: Hiroyasu Sugano; Kazuki Matsui; Jun Kakuta, all of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/222,832

(22) Filed: Dec. 30, 1998

(30) Foreign Application Priority Data

Jul. 8, 1998 (JP) .................................................. 10-193179

(51) Int. Cl.$^7$ ....................................................... G06F 13/00
(52) U.S. Cl. ................................................................. 709/223
(58) Field of Search ..................................... 709/200, 203, 709/213, 223; 705/10, 23, 51

(56) References Cited

U.S. PATENT DOCUMENTS 5,794,207 * 8/1998 Walker et al. ........................... 705/23
5,872,850 * 2/1999 Klein et al. ............................. 705/51
6,112,186 * 8/2000 Bergh et al. ............................ 705/10

FOREIGN PATENT DOCUMENTS 6-223086 8/1994 (JP) .
8-8962 1/1996 (JP) .
8-249388 9/1996 (JP) .

* cited by examiner

Primary Examiner—Robert B. Harrell
(74) Attorney, Agent, or Firm—Staas & Halsey LLP

(57) ABSTRACT

An information management system includes a server connected to a network 1 so as to manage and communicate information related to users. The information managing/communication system includes a user information storage device, user information management device, object compiling device, update notification device, request processing device, object storage device, output device, and object changing device. When a change is made in the user information stored in the user information storage device, the update notification device notifies the occurrence of the change and also an attribute of the changed user information to the other users who previously received the user information. The user then updates the relevant user information object of the object storage device based upon the notification.

34 Claims, 28 Drawing Sheets

FIG. 2

| ITEM NO. | ITEM NAME | CONTENT | NOTIFICATION DESTINATION | CHANGE FREQUENCY |
|---|---|---|---|---|
| 1 | USER ID | : id0001 | id0001 | — |
| 2 | PASSWORD | : 9999 | id0001 | — |
| 3 | NAME | : FUJITSU TARO | — | — |
| 4 | OFFICE NAME | : FUJITSU K.K | ALL | DURING CONNECTION |
| 5 | TEL | : ○○△△×××× | GROUP B(CUSTOMER) | DURING CONNECTION |
| 6 | FAX | : ○○△△××○○ | GROUP B(CUSTOMER) | DURING CONNECTION |
| 7 | MAIL ADDRESS | : taro@fujitsu.com | GROUP A | REAL TIME |
| 8 | PRESENT STATE | : ON MEETING | GROUP A | REAL TIME |
| 9 | CONTACT ADDRESS | : 0309999999 | GROUP A | 1 TIME / HOUR |
| 10 | SCHEDULE | : BUSINESS TRIP (TOMORROW) | GROUP A | 1 TIME / DAY |
| ⋮ | ⋮ | ⋮ | ⋮ | ⋮ |
| 1 | USER ID | : id0002 | id0002 | — |
| 2 | PASSWORD | : 3333 | id0002 | — |
| 3 | NAME | : FUJITSU HANAKO | — | — |
| ⋮ | ⋮ | ⋮ | ⋮ | ⋮ |

FIG. 3

UIO

```
OBJECT NO.    : Obj0001
USER ID       : id0001
NAME          : ○○××
OFFICE NAME   : FUJITSU
TEL           : ○○△△××××
FAX           : ○○△△××○○
MAIL ADDRESS  : ××@△△
COMMENT       : ○○○ --------
```

FIG. 4

UIO TRANSMISSION HISTORY

| | |
|---|---|
| USER ID | : id001 |
| PASSWORD | : 9999 |
| ⋮ | ⋮ |
| OBJ NO. | : Obj0001 |
| ISSUE DESTINATION | : id0002, id0004... |
| CONTENT | : MAIL ADDRESS |
| FORMING DATE | : 1998/4/27 |
| USER ID | : id0002 |
| ⋮ | ⋮ |
| USER ID | : id0003 |
| ⋮ | ⋮ |

FIG. 18

DUPLICATION INFORMATION OF USER INFORMATION DB

```
DUPLICATION ID      : Copy0001
UIO ID              : Objl1111
DUPLICATOR ID       : id0001
DUPLICATION OWNER ID : id0002, id0003
DUPLICATION DATE    : 1999/5/20

DUPLICATION ID      : Copy0002
UIO ID              : Obj2222
         ⋮                ⋮
```

FIG. 19

CONCEPTIONAL DIAGRAM OF DUPLICATED UIO

```
DUPLICATION ID     : Copy xxxx
OBJ NO.            : Obj OOxx      ⎫
     ⋮                  ⋮          ⎬  ORIGINAL UIO
DUPLICATOR         : id OOxx       ⎭
DUPLICATION DATE   : yyyy/mm/dd
```

SYSTEM FOR EXCHANGING USER INFORMATION AMONG USERS

BACKGROUND OF THE INVENTION

A. Field of the Invention

The present invention relates to an information exchanging method, an information management system, an information managing apparatus, an information communicating apparatus, a computer readable recording medium for recording thereon an information managing/communicating program, a computer readable recording medium for recording thereon an information managing program, and also a computer readable recording medium for recording an information communicating program, by which information related to users on a network is communicated on the network, so that mutual relationships among the users on the network are emphasized to thereby support/promote activities of the users.

B. Description of the Related Art

In the present invention and in the discussion of the related art, the following terminology should be understood. For instance, the term "user" includes not only individuals, but groups of people, organizations, etc. Further, the term user also generically refers to a person, group or organization that accesses information or has other activities on a network such as a local area network (LAN) or the Internet.

Information related to a user (referred to as "user information" hereinafter) includes user attributes that include both static information and dynamic information. User information may also include information related to communication conditions that the user utilizes, such as the route user information must follow during transmission from a point of access of the terminal used by the user to access the data or information from a server. The above mentioned static information includes, for instance, a personal name, a firm name, a home address, a business address, regular access location, a contact address, and a hobby. The dynamic information includes, for example, a current connection condition, and present conditions of a user, e.g., a current location (which may differ from the regular access location).

Also, the term "user terminal" is an "information terminal" such as a computer or computer terminal that utilizes user information to connect the user terminal to a server via a network for the user's use. A user terminal can be, for instance, a personal computer, a PDA (Personal Digital Assistant), a workstation (WS), a portable telephone, and so on.

Recently, Internet techniques have advanced considerably and, correspondingly, the number of Internet users has increased dramatically. Further, information communicating/utilizing possibilities by way of such techniques for storing/opening and transmitting various kinds of information on the World Wide Web (WWW) are accelerating. The information to be communicated involves personal information and information related to services and service providers. Thus, various user services such as information retrieval services and introduction related services based activities upon the above-described information are currently available.

There are proposed systems whereby personal information may be exchanged between persons over a network or the Internet. That is, an assembly of personal information, for example, a group to which a person belongs, and a contact address, is communicated via a network, such as the Internet, in a form of an electronic calling card to various other users. The conventional technique of exchanging calling cards in the real world is being brought to the network world.

The calling card exchange technique may serve as an aid whereby various users can become acquainted with other users even though these users are remote from one another.

One such calling card service established by the Applicant is known as "e-MEISHI" (electronic business card or calling card service) at the WWW site Teleparc (http://www.teleparc.com/) on the Internet. This electronic calling card service "e-MEISHI" is such a service that a user can register his or her personal calling card with a server to have the personal calling card exhibited and, interesting calling card from another user may be exchanged. Thereby, various users can collect calling cards of other users in order to further communications and social networking.

Some of the problems to be solved by the present invention are as discussed below.

In the communication modes relating to the conventional calling cards, the data such as personal information described in the calling cards are merely distributed via the network to the users. As a result, the personal information provided to the users constitutes static information which is not changed after the personal information is registered, and may become outdated over a lapse of time.

The actual information of the calling cards collected by utilizing the above-described "e-MEISHI" of the Teleparc site exists in the server. When the content of the information relating to a calling card is updated, this updated card content is reflected on the calling card in the server. However, this updated card content is not reflected in the calling card that was previously downloaded by another client or user. In other words, the data in the calling card that has been downloaded via a browser to the respective user terminals corresponds to the information that existed on the server at the time of the downloading, namely the static information.

As described above, in the conventional electronic calling card systems, the contents described in the electronic calling cards are not changed after these electronic calling cards are received, and the calling card information becomes outdated over a lapse in time. The user information normally changes over a period of time. Users, groups, etc. often may then update their calling card information by contacting the server. The updated information is then updated in the database of the server accordingly. However, those users who previously downloaded calling card information now have outdated information. Only users who download information after updating have up-to-date information in their possession. Further, if dynamic information such as the present location information (where the user is not at his or her usual location) and the present activity conditions are reflected in the electronic calling cards, then the calling cards only reflect such information at the time of downloading and rapidly become obsolete.

Another problem with electronic calling cards is that some users do not want all information about themselves to be available to anyone who accesses the server database. For example, some users may not want a sales organization to receive relatively private information, such as home telephone numbers or home addresses. Some users may only want specific parties such as close personal friends or business acquaintances to have access to certain information on their calling cards. In the current electronic calling card system, all information in the calling card is available to any party accessing the electronic calling card database.

SUMMARY OF THE INVENTION

One object of the present invention is to solve the above-described problems. Specifically, an object of the present invention is to provide an information exchanging method that allows for a reliable way to provide users with updated information corresponding to previously downloaded information.

Another object of the present invention is to provide an information management system with means for selectively making information available to others, where restriction of information concerning each individual user is determined by that user.

To solve the above-described problems, there a first aspect of the present invention of an information exchanging method for exchanging information between a plurality of user terminals. The plurality of user terminals includes at least a first and a second user terminal. The information relates to corresponding users at corresponding user terminals and the information is stored on the respective user terminals. The user terminals are connected to each other via a network. The invention includes the steps of:

transmitting user information to a first user terminal, the transmitted user information being based upon user information stored in a second user terminal, the transmitted user information being transmitted from the second user terminal;

providing the second user terminal with transmission information relating to the transmitted user information transmitted to the first user terminal, the transmission information including a transmission destination corresponding to the first user terminal;

sensing in the second user terminal changes in portions of the user information stored therein, and further determining if sensed changes in the portions of the user information require updating of corresponding portions of user information previously transmitted to the first user terminal;

notifying the first user terminal of changes in the portions of the user information; and transmitting changes in the portions of the user information to the first user terminal in response to sensing and determining changes in the portions of the user information.

When a change is made in original user information, other terminals that previously received the original user information are notified of the changes. This provides the users at the other terminals an opportunity to receive updated user information. Thus, the user information previously transmitted can be easily updated.

Preferably, in a second aspect of the present invention, the information exchanging method also includes the steps of:

determining access level information related to the user information saved in the second user terminal, the access level information having determined levels of access to the user information including the transmitted user information in the first user terminal; and determining which portions of changed user information are to be transmitted to the first user terminal, and determine timing of transmission of changed user information based upon the access level information.

In accordance with the second aspect of the present invention, for example, each user can designate a plurality of access levels. Each access level defines portions of user information that may be transmitted. The user can designate which group of other users is allowed to receive the defined portions of user information. Thus, portions of the user information may be restricted. Further, during the updating procedure, only those portions that have been changed are transmitted according to the access level restrictions. Also, the timing of change notification is likewise defined by users with respect to the various items of the user information and change notification is made in accordance with the set notification timing.

Preferably, in a third aspect, the information exchanging method further specifies that the transmitted user information is an user information object that is in the form of a electronic calling card corresponding to a user utilizing the second user terminal.

In the third aspect of the present invention, the user information object is in the form of an electronic calling card. Each electronic calling card includes items compiled from the user information, such as, a personal name, a firm name, an address, and a telephone number. In addition, the user information may contain information for specifying the above-described transmission destination, and also a transmission condition of the user information.

In accordance with a fourth aspect of the present invention, an information management system includes a server connected via a network to a plurality of user terminals. The system includes a processing means for issuing a request to receive user information from each of the user terminals. A user information storage means stores the user information in the server, the user information including information about respective users utilizing the user terminals. There is also a user information management means in the server for managing the contents of the user information storage means in response to requests from the processing means in the user terminal. An object compiling means in the server issues a user information object from corresponding user information in response to the requests from the processing means. A communication means in the server transmits issued user information objects to corresponding ones of the user terminals in response to the requests from the corresponding one of the user terminals. An update notification means in the server is configured to detect changes in the user information stored in the user information storage means. The update notification means is further configured for notifying detected changes to corresponding ones of the user terminals where the corresponding ones of the user terminals previously received user information. An object storing means in the user terminals stores the user information object sent from the server. Further, an object updating means changes the content of the user information object stored in the object storage means in response to notification from the update notification means.

In the fourth aspect of the present invention, the request processing means issues a request to receive user information. The user information storage means stores the user information. The user information management means arranges the contents of the user information storage means in response to the request for the user information. The object compiling means forms an user information object based upon the user information in response to the request for user information. The formed user information object is then transmitted to the source of the request. The update notification means detects changes in the user information stored in the user information storing means, and notifies user terminals that have previously received user information objects that changes have been made.

The object storage means stores the user information object sent from the server. The output means outputs the stored user information object. The object updating means changes the content of the user information object stored in the object storage means on the basis of the change notification.

The server stores the user information about one, or plural users into the database (DB) and the memory. The server acquires the user information of various users and user terminals, issues user information to identified users in accordance with, for example, levels of access and specific requests, and registers or changes user information in accordance with the request processing means.

Conversely, in response to the request for user information issued from a user terminal, the server of the present invention reads out the requested user information from the user information storage means, forms the user information object by the object compiling means, and issues the user information object to identified user terminals via the network. Preferably, a serial number is assigned to the user information object to be issued, so that the user information object may be properly identified later. The serial number is discrimination information. Also, the server creates and updates a transmission history of the issued user information objects into the user information storage means. The transmission history becomes a portion of the user information.

The user terminal according to the present invention receives the user information object formed in response to the request via the network, and then stores the received user information object into the object storage means. When a change is made in the user information stored in the user information storage means, the server specifies other user terminals which store previously transmitted user information that now needs to be update. Other user terminals are identified on the basis of the transmission history of the user information object. When change is detected, notification is sent via the update notification means to the identified other user of the occurrence of change and the attribute of the changed user information.

Further, in the case where the change notification is received and accepted by a user at one of the identified other user terminals, the relevant user information is updated in previously transmitted user information objects stored in the identified other user terminals. Notification of changes in the user information may be sent to identified other user terminals immediately after the changes are identified, or notification may wait until requested by the identified other user terminals.

In accordance with the above described information management system, the content of the user information object saved in the object storage means is easily made coincident with the user information in the user information storage means in the server. Therefore, it is possible to prevent the occurrence of contradiction between the information saved by the user and the server. As a result, the communications among the users can be performed in a smooth manner.

Preferably, in a fifth aspect of the present invention the user information includes predetermined access control information used by the user information management means to determine access to predetermined portions of the user information by the user terminals. The information management system further includes access control means for controlling arrangement of the user information management means based on the access control information.

In the fifth aspect of the present invention, for example, when a plurality of items are contained in the user information, it is possible to define a groups of users to which these items may be disclosed via access levels defined by each user who supplies user information. For example, if a user B wishes to receive user information concerning a user A, access to user A's user information is determined by user A in the defined access levels. User B's request is processed and the amount of information provided to user B is determined in accordance with the defined access levels set by user A.

Preferably, in a sixth aspect of the present invention, information adding means in the user terminals adds and changes user information corresponding to transmitted user information object.

In accordance with the sixth aspect of the present invention, a user may wish to add, for instance, a personal message to his or her user information object when the user information object is to be transmitted to other users. A notification is sent to the other user or users that indicates a new user information object can be received.

Preferably, in a seventh aspect of the present invention, the user information in the user information storage means includes notification control information used by the update notification means. The notification control information includes a content control file and a frequency control file. The content control file indicates content of previously transmitted user information objects and the frequency control file includes information regarding the frequency updates are required. The server further includes a change notification means which operates with the update notification means, the change notification means accessing the content control file and the frequency control file in response to operation of the update notification module.

In accordance with the seventh aspect of the invention, for example, if a plurality of items are contained in the user information, and a change is made to several items, then the change notification must be sent to other user terminals to receive the changed information. The notification control information referred to above provides a means for setting various parameters to be used as a basis for update notification. For example, a user may request that notification of changes in a mail address are to be sent to "a person in an office", and notification of changes in a present condition should be sent to "group A". The notification control information may be set and the setting of the notification control information may be changed by the above-explained information registering means by an identified user.

Preferably, in accordance with an eight aspect of the present invention, the user information in the user information storage means contains notification control information used to control update notification. Further, the server includes means for controlling update notification by the update notification means, such that, in response to detection of changes in the user information, the notification control information is used to identify ones of the user terminals that have received user information objects that include information corresponding to changed portions of user information data.

In other words, the notification process is conducted in accordance with notification control information set by the user who changes his or her user information and the notification control information set by the user who is meant to receive the change notification. At the time of change notification, the change notification control means properly determines which notification control information has priority over the other.

Preferably in a ninth aspect of the present invention, the notification control information also includes information related to a change notification destination and timing of the change notification.

In the notification control information, the notification destination may be set, or the notification timing may be set, depending designation by the user. For instance, the notification control information involves "if a change occurs, then this change can be immediately notified", "a change is notified during connection", and "a change is notified every 1 hour".

Preferably in a tenth aspect of the present invention, change notification means in the user terminals outputs information to a user indicating that there is an update to a previously received user information object stored in the object storage means.

When the user information object is changed, notification is transmitted respective users such that a message is displayed on the screen of the corresponding user terminal telling the user of the change by, for instance, displaying in the user information object in a reverse manner (in terms of color palette, for instance) and a sound is emitted to alert the user.

Preferably in an eleventh aspect of the present invention, the user information contains discrimination information used to determine invalidity of user information. The information management system further includes invalidity detecting means in the user terminal for detecting invalidity of an user information object stored in the object storage means. As well, there is an invalidity notifying means that outputs a detection result of the invalidity detecting means.

The discrimination information related to invalidity of user information may include, for instance, designation by a user that his or her user information is invalid, or by a valid time period of the user information (outdated). Notification of the invalidity of the user information sent by the update notification means to identified user terminals with previously transmitted user information object containing the now invalidated user information.

In the user terminal receiving the notification, the invalidity is detected by the invalidity detecting means independently from the change in the object, and notification of the invalidity of the object is given to the user by the invalidity notifying means. As the notification method, the invalidity may be visually shown, or notified by a sound at the user terminal.

Preferably in a twelfth aspect of the present invention, there is an information acquiring means in the server that is configured to monitor the user terminals and acquire dynamic information concerning the user terminals. The information acquiring means is further configured to notify the user information management means of changes in the acquired dynamic information.

Dynamic information includes action information such as the present location of a user, the users connection condition (logged on to the network or not), and a contact address. The action information is collected by the information acquiring means, and the acquired action information is written into the user information stored in the user information storage means, so that the present condition of the user can be reflected on the user information.

Preferably in a thirteenth aspect of the present invention, there is an exchange instruction means in each of the user terminals that is configured for specifying others of the user terminals in a request to exchange user information objects. The exchange instruction means also responds to requests from other user terminals allowing or declining an exchange of user information objects. An exchange confirming means in the server is configured for instructing the object compiling means to issue and transmit the compiled user information object to the other user terminals in response to an allowing response from the other user terminals.

The exchange instructing means notifies the specified other user terminals that an exchange request has been issued by the specifying user. The other users who receive the exchange notification respond to the request via the responding means. If one of the other users response positively, then the user information object is formed and issues in order that the mutual user information objects are exchanged between responding the users. However, after a predetermined time, no further action is taken if no further response has been received to the request.

Preferably, in a fourteenth aspect of the present invention, the information management system further includes a comparing means in the server and the user terminals that compares contents of a user information object stored in the object storage means with a content of user information stored in the user information storage means.

Since the content of the user information object is compared with the original user information by the comparing means, it is possible to confirm as to whether or not the content of the user information object is correct.

Preferably, in a fifteenth aspect of the present invention, the information management system further includes a first digest forming means in the user terminals for forming a digest of user information objects stored in the object storage means. In making the formed digest, a user terminal specifies data fields of a user information object from another user. A second digest forming means in the server forms a corresponding digest for each user information object transmitted to a given user terminal. A digest comparing means in the server compares each digest formed by the first digest forming means with a corresponding digest formed by the second digest forming means to confirm accuracy (for instance, to confirm that the data has been updated).

It should be noted that a digest corresponds to such information that may be abstracted from the original user information object in discriminate-able form, and thus the original user information object can be identified from the abstracted information. The second digest forming means specifies user information from a transmitted digest to thereby form another digest of user information about the specified user information stored in the user information storage means. The digest comparing means compares the digest formed by the first digest forming means with the digest formed by the second digest forming means to confirm the accuracy of information therein.

In other words, the first digest forming means transmits the digest of the user information object stored in the object storage means to the server. The server specifies the user information from which the digest should be formed corresponding the received digest, and forms the digest from the object transmission history. The digest comparing means compares the transmitted digest with the formed digest and notify the comparison result back to the first user terminal. The user may request an updated user information object on the basis of the transmitted comparison result.

Preferably, in a sixteenth aspect of the present invention, the information management system further includes a duplication management means in the user terminals that forms a duplication of the user information object. In the duplication, predetermined duplication information including source information specifying at the source of such duplication is added to the user information object stored in the object storage means. The duplication management means also issues the duplication to the server via the network.

In the case that a user requests that another user terminal provide an user information object relating to yet another user, the duplication compiling means forms a duplication object that includes the predetermined duplication information and also contains the duplication source information added to the original user information object. The duplication compiling means adds new duplication source information also when a duplication of a duplication is formed for still yet another user terminal. As a result, even when duplications of duplications are transmitted, the original source of the duplications and subsequent relaying sources of duplications may be maintained.

Preferably, in a seventeenth aspect of the present invention, the information management system further includes a duplication management means in the user terminal for forming a duplication object in which predetermined duplication information is added to the user information object stored in the object storage means. The duplication management means is also configured for issuing the formed duplication object to the server via the network. A duplication notifying means notifies pre-selected duplication information indicative of a duplication history to the user information storage means in the server in response to issuing the duplication object.

When the duplication object is sent out to, for instance, another user terminal from a first user terminal, the transmission history of the duplication object can be contained in the user information by adding predetermined duplication information to the user information storage means. As a result, the originator of the user information (or providing user) may refers to the transmission history and can confirm, in full, activity of other user who have received user information related to the originating user.

In accordance with an eighteenth aspect of the present invention, the information management system further includes a duplication confirming means for confirming whether or not an issued user information object is a duplication. Further, a duplication notifying means notifies the user information storage means of predetermined duplication information indicative of a duplication history in a case where the duplication confirming means confirms that the issued user information object is a duplication.

For instance, the user terminal that receives the user information object first determines whether or not the received object is a duplication object. If this received object is a duplication object, then the user terminal transmits predetermined duplication information to the user information storage means. The duplication information contains the information indicative of the duplication history. The user can recognize other users who have received the information related to his own with reference to the duplication history of the user information.

Preferably in accordance with a nineteenth aspect of the present invention, the predetermined duplication information contains information for specifying at least the duplication object, and a transmission destination of the duplication object.

As the duplication information, it is preferable to contain a duplication number for specifying a duplicated object and a user ID for specifying a duplication owner. Additionally, this duplication information may involve a name of a duplication forming person, and a duplication forming date.

Preferably, in accordance with a twentieth aspect of the present invention, the information management system further includes an object requesting means in the user terminal for requesting transmission of at least one user information object to another of the user terminals. An identification means is configured to identify a user requesting transmission of the requested user information object such that only requests from an identified user corresponding to the user information object cause user information objects to be issued.

When a user requests that a user information object be transmitted to others, the identification means determines whether or not the user is the originator of the user information in question. When the identification means determines that the requesting user is identical with the originator of the user information, the identification means instructs the compiling means to send out the user information object. Conversely, when the identification means determines that the requesting user is not identical with the originator of the user information, then only the above described duplication object may be sent out (including duplication source information).

Preferably, in a twenty-first aspect of the present invention, the information management system further includes a replacing means for comparing previously transmitted user information objects with the user information objects previously stored in the object storage means. The replacing means also replaces user objects stored within the object storage means in response to results of the comparing.

The replacing means compares the sent user information object with the held user information object as to the same user. Then, the replacing means determines whether or not the stored user information object is replaced on the basis of the comparison result. For instance, when the forming date of the sent user information object is newer than that of the stored user information object, the replacing means executes the replacing process.

Preferably, in a twenty-second aspect of the present invention, the information management system further includes a display means for visually displaying contents of the user information objects.

For instance, as the visual representation, the content may be displayed in a format of a calling card.

Preferably, in a twenty-third aspect of the present invention, the display means is configured to change a display format such that contents of the user information object may be altered in appearance and organization.

For example, each object may be displayed in dated order and the older forming date of older objects may be displayed in a darker shading. Also the respective specific groups may be displayed, depending upon the description contents.

Preferably, in a twenty-fourth aspect of the present invention, the information management system further includes a communication means in each of the user terminals such that the user terminal is configured to execute network application software which uses the communication means. The communication means is configured for entering a portion of information contained in one of the user information objects into the network application software.

For instance, when a user clicks a column of one attribute value within one object among objects on the display, for example, a column of contact address information, the notifying means notifies the contact address information to network application software, for instance, an Internet Relay Chat (IRC) service. Since the. notified contact address information can be transferred to a counter party as a portion of the chat content on IRC, the smooth communication can be made by using another network application software in combination with the present invention.

Preferably, in a twenty-fifth aspect of the present invention, there is a communication requesting means in each of the user terminals and each of the user terminals is configured to execute network application software and issue a communication request to other of the user terminals requesting the other of the user terminals to execute the network application software using the communication means. Also, there is a communication confirming means in each of the user terminals for responding to the request to execute the network application software.

For instance, a communication is requested from a user B to a user A by using the communication requesting means. The user A responds to the requested communication by using the communication confirming means. Both the communication requesting means which receives the response and the communication confirming means which notifies the response initiate the respective network application software, for example, IRC on the basis of the response, so that the communication is commenced.

In a twenty-sixth aspect of the present invention, an information management system includes a server for managing user information related to users on a network, and at least one user terminal connected via the network to the server, for communicating the user information. The server includes an user information storage means for storing the user information and an user information management means for maintaining contents of the user information storage means in response to requests from the user terminals related to user information. An object compiling means forms a user information object based upon the user information in response to requests from the user terminals. The object compiling means is further configured for issuing and transmitting the user information object to selected ones of the user terminals. An update notification means detects a change in the user information stored in the user information storage means, and notifies the change to corresponding ones of the user terminals which previously received a corresponding user information object. Further, the user terminal includes a request processing means for issuing a request to the server for transmission of a user information object to other of the user terminals. An object storage means stores user information objects received from the server. An output means outputs stored user information objects for. a user to access. An object updating means for updates portions of the contents of the user information object stored in the object storage means in response to update notification received from the server.

The user information storage means stores the user information for every user. The user information management means arranges contents of the user information storage means on the basis of a request related to the user information and issued from the user terminal. The object compiling means forms a user information object based upon the user information in accordance with the request related to the user information and issued from the user terminal, and sends out the formed user information object to the user terminal. The update notification means detects a change in the user information stored in the user information storage means, and notifies the change to the user terminal that has previously received the now changed user information.

The request processing means issues a request related to the user information to the server. The object storage means stores a user information object sent from the server. The output means outputs the stored user information object. The object updating means changes contents of the user information object stored in the object storage means on the basis of the change notification sent from the server.

The server stores the user information so as to manage updating and changing of the user information. When a request related to the user information is issued from a user terminal, the user information object to be sent out is formed. Also, a change in user information is notified to a user terminal. The user terminal requests the server to receive the user information, and then receives the sent user information object. When the change is made in the user information, the user information is rewritten in accordance with this change notification.

In accordance with a twenty-seventh aspect of the present invention, an information managing apparatus is connected via a network to a plurality of user terminals, for managing information related to a user and communicated among the plurality of user terminals. The information managing apparatus includes user information storage means for storing the user information and a user information management means for arranging contents of the user information storage means in response to a request related to user information and issued from one of the user terminals. An object compiling means forms a user information object based upon the user information in response to the request related to the user information and. issued from the user terminal. The object compiling means further transmits the formed user information object to the user terminal. An update notification means detects a change in the user information stored in the user information storage means, and notifies the change to respective ones of the user terminals which store the outdated user information.

The user information storage means stores the user information for every user. The user information management means arranges contents of the user information storage means on the basis of a request related to the user information and issued from the user terminal. The object compiling means forms a user information object based upon the user information in accordance with the request related to the user information and issued from the user terminal, and sends out the formed user information object to the user terminal.

The update notification means detects a change in the user information stored in the user information storage means, and notifies the change to the user terminal that previously received the now changed user information.

The information managing apparatus holds the user information on the network, and distributes the user information in response to the request issued from the user terminal. When a change is made in the user information, the information managing apparatus updates the user information, and furthermore notifies the change to the user terminal holding the changed user information.

In accordance with a twenty-eighth aspect of the present invention, an information communicating apparatus is connected via a network to a server for managing information related to users on the network and for communicating the user information. The apparatus includes a request processing means for issuing a request related to the user information to the server. An object storage means stores an user information object transmitted from the server. An output means outputs the stored user information object. An object updating means updates the contents of the user information object stored in the object storage means in response to change notification of the user information transmitted from the server.

The request processing means issues a request related to the user information to the server. The object storage means stores a user information object sent from the server. The output means outputs the stored user information object. The object updating means changes contents of the user information object stored in the object storage means on the basis of the change notification of the user information sent from the server.

The information communicating apparatus requests the sever to receive the user information. In the case that a change is made in the user information acquired from the server in response to the above-described request, the information communicating apparatus receives this change notification from the server and rewrites the present user information by the changed user information. As a result, the information communicating apparatus can always hold the latest user information.

In accordance with a twenty-ninth aspect of the present invention, a computer readable recording medium has recorded thereon an information management and communication program used in a user terminal connected via a network to other user terminals. The program is for managing/communicating information related to users on the network. The information managing/communicating program performs the following steps:

A) entering user information from a user terminal;

B) storing the user information;

C) arranging and managing the user information such that contents of stored user information is in accordance with entered instructions relating to the user information;

D) an object compiling step for forming a user information object which describes the user information in accordance with a request from the user terminal for issuance of the user information object to a selected other user terminal;

E) an update notification step for detecting changes in stored user information, and for notifying recognition of the change to the other user terminal which previously received a corresponding user information object;

F) an object storing step for storing a user information objects sent from other user terminals;

G) an output step for outputting the stored user information object; and

H) an object updating step for changing the content of the stored user information object in response to receipt of the update notification sent from the other user terminal.

The twenty-ninth aspect of the present invention has a similar effect to that of the first aspect of the present invention.

In accordance with a thirtieth aspect of the present invention, a computer readable recording medium has recorded thereon an information managing program used in a server connected via a network to a plurality of user terminals for managing information related to users on the network. The information managing program executes the following steps:

A) storing user information;

B) managing and arranging contents of stored user information in response to instructions from a corresponding user terminal;

C) compiling an user information object based upon the user information in response to instructions from a user at the corresponding user terminal, and for issuing the formed user information object to other user terminals; and D) detecting changes in the stored user information and transmitting an update notification the other user terminals in response to detection changes.

The thirtieth aspect of the present invention has similar effects to that of the twenty-eighth aspect of the present invention.

In accordance with a thirty-first aspect of the present invention, a computer readable recording medium has recorded thereon an information communicating program used in user terminals connected via a network to a server for managing information related to users on the network. The information communicating program executes the following steps;

A) issuing a request for input of user information to the server;

B) storing an user information object sent from the server;

C) outputting the stored user information object; and

D) updating the content of the stored user information object in response to an update notification from the server.

The thirty-first aspect of the present invention has similar effects to that of the twenty-ninth aspect of the present invention.

BRIEF DESCRIPTION OF THE DRAWINGS

FIG. 2 is a chart representing data in stored in a database maintained in the server of the information management system depicted in FIG. 1, the data being based upon user information initially inputted into the database, the data being used to subsequently create an user information object (UIO);

FIG. 3 is a diagram showing an example of a UIO transmitted to various users where the information in the UIO is derived from the user information depicted in FIG. 2;

FIG. 4 is a diagram showing an example of transmission history of the UIO including information identifying users who received the UIO and the information contained in the UIO at the time of transmission, the transmission history being stored in the database in the information management system;

FIG. 5 is updated by a corresponding user from that user's user terminal also depicted in FIG. 5;

FIG. 18 is a chart representing duplication information stored in a user information DB in the server depicted in FIG. 17;

FIG. 19 is chart representing one of a plurality of duplicated user information objects produced in the system depicted in FIG. 17;

DETAILED DESCRIPTION OF THE PREFERRED EMBODIMENTS

Figure 1:
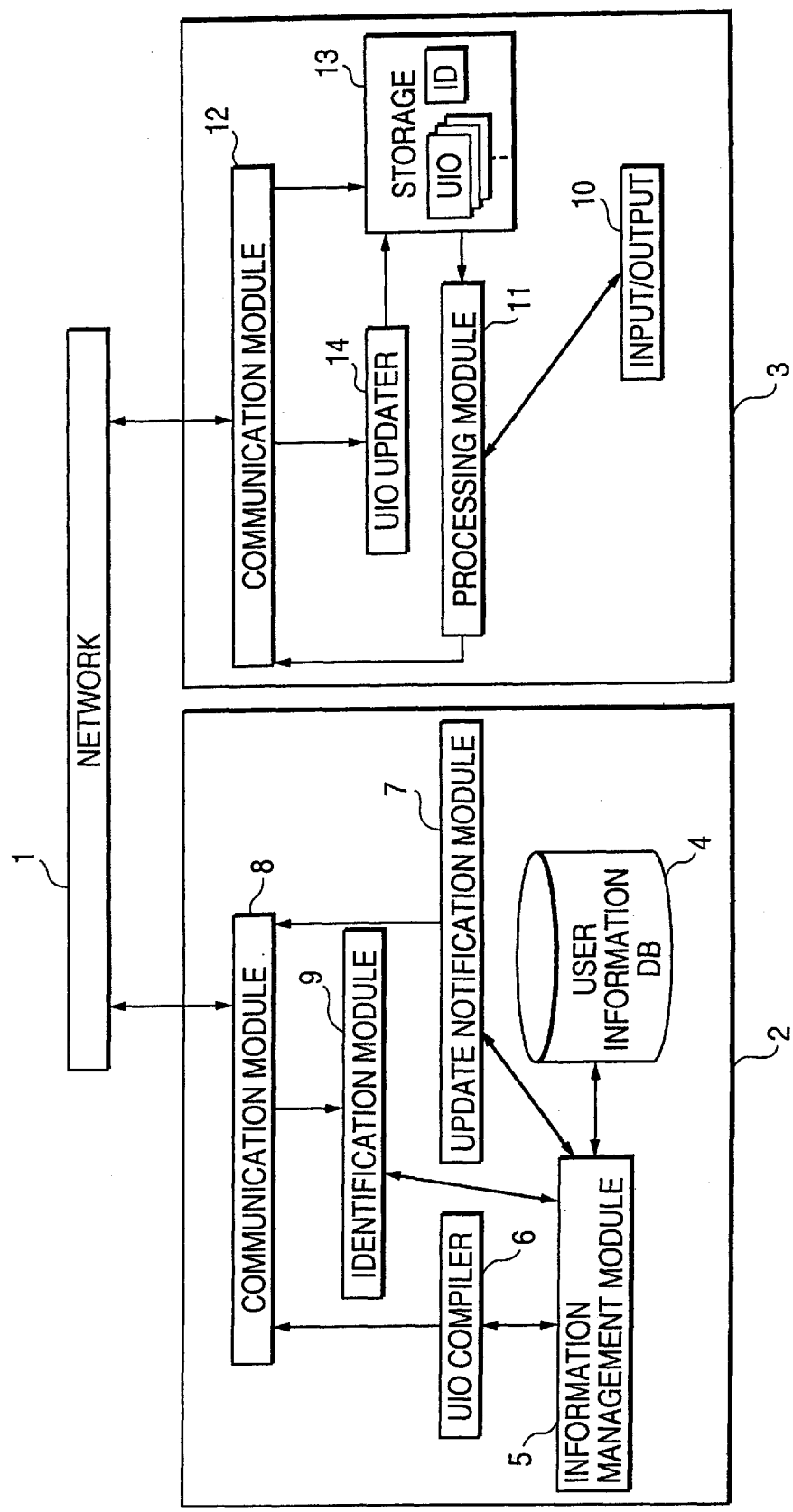
FIG. 1 is a block diagram showing an information management system that includes a server and at least one user terminal which communicate with one another over a network in accordance with a first embodiment of the present invention.

FIG. 1 is a schematic block diagram of an information management system according to a first embodiment of the present invention.

The information management system shown in FIG. 1 includes a server 2 and a user terminal 3 connected via a network 1 to the server 2. The information management system is configured to transmit user information from the server 2 to a plurality of user terminals 3. In order to describe the various features of the present invention more clearly, only one user terminal 3 is shown in FIG. 1. However, it should be understood that a plurality of user terminals 3 are connected to the network 1.

The server 2 communicates via a communication module 8 with the user terminal 3 in response to a request from the user terminal 3. Specifically, the server 2 is configured to transmit to the user terminal 3, a user information object that will hereinafter be referred to as an "UIO". The UIO is preferably in the form of an electronic calling card. Further, as is described in greater detail below, the server 2 is further configured to send a change notification signal to the user terminal 3 in response to changes made in the user information contained in an earlier transmitted UIO. An updated UIO is transmitted to the user terminal 3 from the server 2 when a change is detected.

In the following description of the present invention, it should be understood that the term "module" refers to either software or hardware in a computer system. For example, the communication module 8 referred to above could include a modem connected between the server 2 and the network 1. Alternatively, the communication module 8 could be communication software used in a local area network (LAN) or could be any combination of software and/or hardware which effects communication digitally along a transmission line where the network 1 is a transmission line between linked computers or terminals. Thus, the term "module" is intended to indicate either software or hardware or combinations thereof in a computer system.

The server 2 includes a user information database 4 (hereinafter referred to as DB 4), an information management module 5, a UIO compiler 6, an update notification module 7, a communication module 8, and an identification module 9.

A user information file with user information corresponding to each user connected to the network 1 is stored into the user information DB 4. Initial user information files, including various user attributes, are stored-in the DB 4. The user attributes include items such as: identification information (a user ID and a password); user membership information; telephone number; FAX (facsimile) number; contact address; residence address; a mail address; hobby; personal interests; family information; name of a friend; daily schedule; and other present conditions. FIG. 2 is a diagram showing an example of basic user information maintained by the user information DB 4. The user information shown in FIG. 2 includes a notification destination and a change frequency in addition to the above-described user attribute, as is described below.

The information management module 5 is a general-purpose DB managing system that performs reading, writing, and updating operations on the user information DB 4.

Each user must communicate with the server 2 via a user terminal 3. Each user enters specific user information into a corresponding user information file, as is described above, into the DB 4. This information is stored in the DB 4 and is later used by the UIO compiler 6 to create the UIO's. Any user permitted access may thereafter request that a UIO be provided to him or her, in accordance with certain priorities (described below), where requested UIO includes information about another user. For the purpose of better explaining the present invention, the following designations are provided to assist in understanding the invention. A user who receives an UIO will hereinafter be referred to as a "receiving user". The user whose user information is used to create an UIO will hereinafter be referred to as a "providing user".

In response to a request transmitted from a user terminal 3 to the server 2 by a user, the UIO compiler 6 compiles predetermined portions of the user information of relating to the providing user. Information corresponding to the providing user from the user information DB 4 is accessed to form an UIO. The UIO is then transmitted to the user terminal 3. The predetermined portions of the user information put into the transmitted UIO are determined in accordance with specific instructions from the corresponding providing user. The specific instructions from the providing user include limitations on which predetermined portions of the user information may be provided to receiving users. Further, access levels are designated by the providing user to define which type of requesting users may access corresponding groups of predetermined portions of the user information.

FIG. 3 shows an example of some data in one transmitted UIO. A unique object number is assigned to each of the respective UIOs so as to identify that UIO, and a user ID is assigned to identify the corresponding user information data that was the source of information for that UIO. Additionally, item names (data field names), attribute values corresponding to the item names, and a pointer information (ID and URL (Uniform Resources Locator) etc.) indicative of the place where other information is stored are described in each UIO.

When each UIO is compiled and subsequently transmitted, an issuance or transmission history of the UIO is recorded at a predetermined location in the user information DB 4, and becomes a portion of the user information. A UIO is prepared for issuance for the purpose of being transmitted to a receiving user. It should therefore be understood that both issuance of an UIO and transmission of that UIO occur generally simultaneously. In order to simplify the explanation of the present invention, the terms issue and transmission are used interchangably and refer to both the issuance of an UIO and corresponding transmission to an appropriate receiving user.

The transmission history of the UIO contains the contents of the UIO at the time it was transmitted, information indicative of, for example, a user ID of a transmission destination corresponding to the receiving user, and a transmission date. Alternatively, other additional information may be recorded on the user information DB 4, if required (see the other embodiments described below). FIG. 4 shows user information involving the UIO transmission history, which is described in greater detail below with respect to other embodiments.

Occasionally, a providing user may change or update the information in his or her user information file stored in the DB 4. When such changes are made by the providing user, the information management module 5 changes the corresponding information in the DB 4. The update notification module 7 continuously monitors the activity of the information management module 5. When changes are made in user information stored in the DB 4, an update notification is transmitted to each of the user terminals 3 corresponding to receiving users who previously received a corresponding transmitted UIO. The update notification contains an object number, item name or item names corresponding to data that has been changed, and a new attribute value of the UIO. In response to sending the update notification, an updated UIO may be transmitted, as described below.

The identification module 9 receives a request sent from user terminal 3 of any user via the communication module 8, and identifies the user. Next, respective processing modules (described below) perform respective process operations depending upon the identification results, as is described below.

Upon receiving a request, the identification module 9 identifies whether or not the user sending the request is a user registered with authorization to access the user information and receive UIOs. Information received by the identification module 9 from the user terminal 3 includes user identification information. The user identification information includes, for instance, a password and a user ID. If the providing user is properly identified, a UIO is transmitted in accordance with the processes described below.

A typical user terminal is described below with respect to FIG. 1.

The user terminal 3 includes an input/output 10, a processing module 11, a communication module 12, storage 13, and a UIO updater 14. Storage 13 could be, for instance, an optical drive or magnetic media such as a hard drive.

The input/output 10 is configured to receive commands such as a request from a receiving user for information from the server 2. The input/output 10 also outputs results for the purpose of confirmation of an inputted request. The input/output 10 could include, for example, a keyboard and a CRT monitor or other display device.

In the user terminal 3, the processing module 11 receives and edits user identification information; transmits requests for UIOs and requests updated UIOs together with user identification information to the server 2. The processing module 11 also allocates other requested processes to the respective processing modules (as is described in greater detail below) together with the user identification information. In general, the user identification information includes a user ID stored in the storage 13, and a password entered by a user. For example, the processing module 11 displays a screen used to enter a password, and identification of a providing user and/or a receiving user.

The communication module 12 receives UIOs issued from the UIO compiler 6 via the network 1. The storage 13 stores therein the received UIO, and the user IDs of the respective users. The storage 13 may be primary storage such as RAM memory, and/or may be secondary storage such as a hard disk drive (HDD).

If information in an UIO has been changed, then an update notification is transmitted to user terminals 3 corresponding receiving users who have previously received a corresponding UIO. Subsequently, the server 2 transmits. an updated UIO to the user terminal 2. Thereafter, the UIO updater 14 updates the corresponding content of the UIO stored in the storage 13 in response to receiving the updated UIO information which is received by the communication module 12 from the server 2. In other words, the UIO updater 14 determines whether or not a corresponding UIO coincident with an object number contained in the update notification is kept in storage 13. If the UIO is stored in the storage 13, then an attribute value corresponding to the changed subject item of this UIO is updated by replacing the original attribute value with the updated attribute value. For example, if an address for the providing user has changed, then the originally transmitted address in the previously received UIO is replaced by inserting a new address received from the server 2.

In accordance with the first embodiment having the above-described arrangement, user information can be communicated via the network in the form of the UIO. In the case that changes are made in the user information, the fact that changes in the content have been made is transmitted to each user terminal 3 that previously received a UIOs, and the content is automatically updated by the UIO updater 14. As a result, the UIOs stored in the user terminals can be continuously kept under latest conditions.

In response to the various sorts of requests issued from the user, for instance, the request for the issue of UIO and the change of user information, the user is identified, so that only requests from designated users can be processed.

In the description of the following embodiments, it should be understood that all of the embodiments below include all of the aspect of the first embodiment. Therefore, the description of those elements present in the first embodiment are not repeated below but are assumed to be part of the embodiments described below.

A second embodiment of the present invention is described below with reference to FIGS. 5, 6, 7 and 8. It should be understood that the general terms described above with respect to the first embodiment also apply to the second embodiment. For instance, a receiving user is a user who is receiving a UIO and a providing user is a user whose user information is being used to create a UIO. It should be understood that both receiving users and providing users may receive transmitted UIOs in accordance with the limitations determined by the operations of the various embodiments of the present invention.

Figure 5:
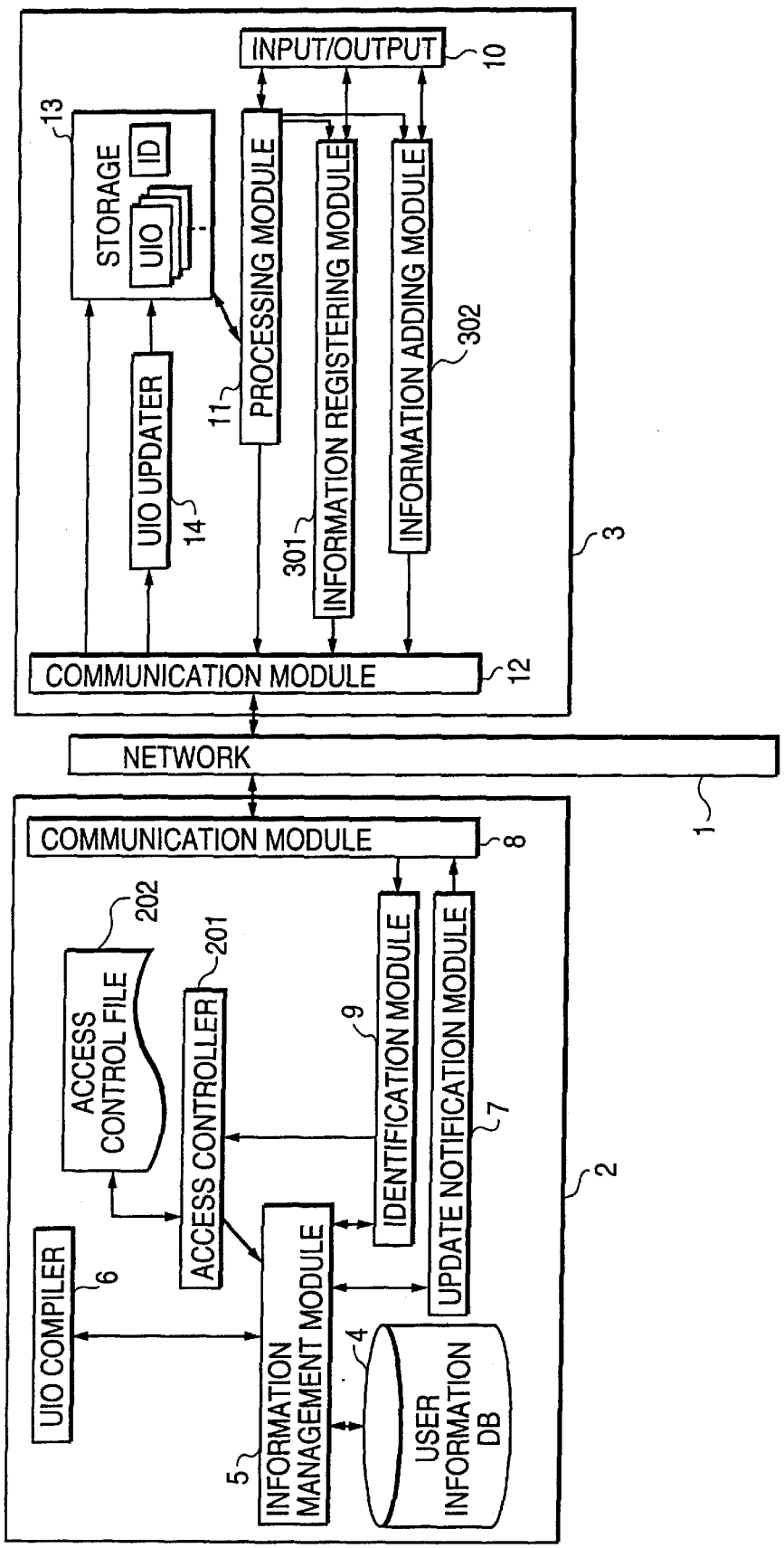
FIG. 5 is a block diagram showing an information management system that includes a server and at least one user terminal connected thereto via a network in accordance with a second embodiment of the present invention.

FIG. 5 is a block diagram showing an information management system according to a second embodiment of the present invention.

In a manner similar to the first embodiment, the information management system shown in FIG. 5 includes a server 2 and a plurality of user terminals 3 connected via a network 1 to the server 2, although only one user terminal 3 is depicted. In addition to the arrangement of the first embodiment, the server 2 further contains an access controller 201 and an access control file 202. Also, in addition to the arrangement of the first embodiment, the user terminal 3 further contains an information registering module 301 and an information adding module 302.

In the second embodiment, a providing user changes registered content of his or her user information by means of the information registering module 301. Also, each providing user utilizes the information registering module 301 to designate both specific receiving users and groups of receiving users, and categories of receiving users who may access their user information via an UIO. The changes in user information and access information are then sent from the information adding module 302 via the communications module 12 to the server 2. The user information is entered into the user information DB 4 and the access information is entered into the access control file 202.

When any user requests information from the server 2, the access controller 201 then uses the information in the access control file 202 to determine the access level of the receiving user. Based upon the access level of the receiving user, an appropriate UIO is transmitted to the receiving user. As a consequence, the UIO can be transmitted in accordance with a pre-designated access level set by each corresponding providing user. With the above features, it is possible to prevent unwanted parties from accessing information that a providing user wishes to be maintained as semi-private.

The access controller 201 of the server 2 functions as a front end of the information management module 5, and determines access to user information on the basis of the access control information saved in the access control file 202 and identification information of the identification module 9. In other words, the identification module 9 is used to first determine if a receiving user is allowed access to the server 2 using identification information entered by each receiving user. If a user requesting transmission of an UIO is approved by the identification module 9 as being an authorized user, then the access controller 201 identifies the access level of each receiving user based upon the information in the access control file 202. Thereafter, an appropriate UIO is transmitted to the receiving user.

Figure 6:
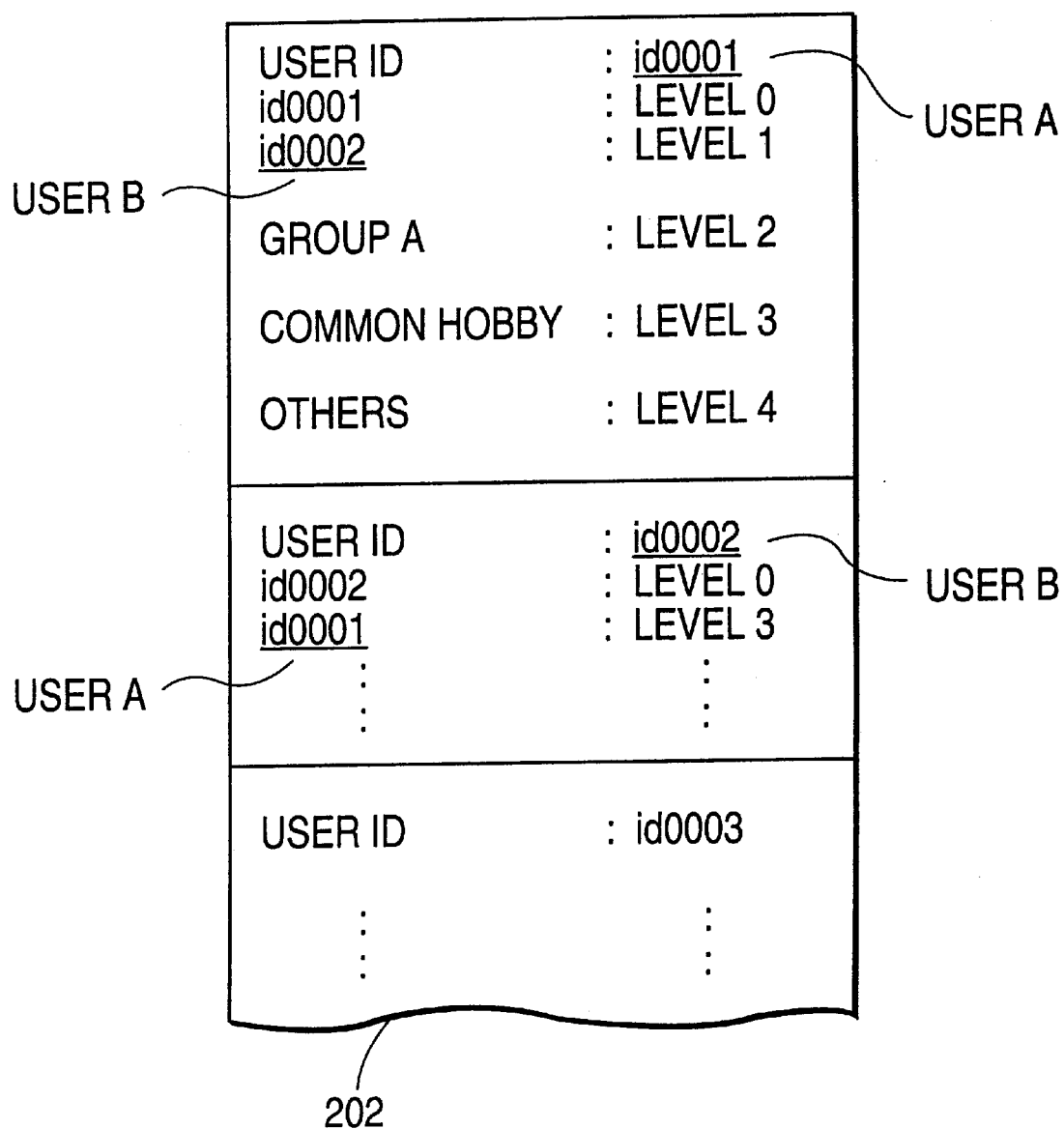
FIG. 6 is a diagram showing an access control file, depicted in FIG. 5, which contains information relating to user determined access levels, where the access levels designate the amount of information that is to be included in an UIO, the access control file further including information designating which users may receive the UIO.

FIG. 6 is an explanatory diagram showing examples of the access control file 202 as set by providing users. For instance, in the upper portion of FIG. 6, the access control file for a user A is depicted. In the central portion of FIG. 6, the access control file for a user B is depicted. The access control file 202 in FIG. 6 shows corresponding access levels that were entered by the providing users A and B for access to UIOs based upon their corresponding user information. In the depicted example for user A, several access levels are shown. Access subject items and access contents to be included in a corresponding UIO are designated by each of the access levels. For instance, the following six access levels are represented in the example access control file in FIG. 6:

Level 0: only user ID iid0001 (providing user) may access Information accessible: all items full disclosure and changeable Level 1: only user ID id0002 may access Information accessible: all items except password and user ID, full disclosure Level 2: only Group A allowed access Information accessible: private information such as name, home address, home telephone number & hobby, in UIO.

Level 3: only receiving users with common hobby Information accessible: business information, (name, firm name, electronic mail address, business telephone number, contact address, present condition) in UIO.

Level 4: All other receiving users who provide their ID Information accessible: all items, except password and ID, disclosure requires receiving user's identification Level 5: Total restriction—no access without ID No items accessible, no UIO issued In this case, the level 0 is an access level allowing only the providing user to access, write or change the information in the user information file. The providing user uses the level 0 to maintain control over the information in his or her user information file. As shown in FIG. 6, each user using the information management system in accordance with the second embodiment, must set the access levels with respect to access allowed to receiving users. In this manner, each providing user can maintain a certain degree of privacy. The access control file 202 may be edited by a corresponding providing user by using the information registering module 301 (described below).

When the above-described access control file is employed, the access to the user information can be controlled on the basis of access control information related to a provider of the user information, and also the access control file designating portions of user information that may be accessed.

For example, in FIG. 6, user A (id 0001) allows all information (except password) to be accessible by user B (id 0002). On the other hand, the user B allows user A access to the information of level 3 (business information). Specifically, if user B is a receiving user requesting an UIO from the user information of user A, then only the business information designated by the access levels set by user A are issued and transmitted to user B in a UIO. However, if user A is a receiving user requesting an UIO from the user information of user B, then a smaller predetermined set of information is compiled into a corresponding UIO and transmitted to user A. The smaller predetermined set of information is based upon an access level 3 (in the middle portion of FIG. 6) set by user B for user A (with user ID id0001).

The information registering module 301 is configured to enter and edit user information by a providing user. The information registering module 301 is further configured to transmit entered user information to the server 2. Further, for new users, the information registering module 301 is configured to register the new user as a user of the information management system of the present invention. An instruction to register user information by a user is sent by the information registering module 301. A user may newly input their user information by using the information registering module 301.

The information adding module 302 is configured to allow a providing user to add additional information to his user information for use in a subsequently issued UIO issued by the server 2. For instance, the additional information may be a message to be inserted in a UIO to be sent to a specific user. When the additional information is to be added, the information adding module 302 transmits the entered message and ID of the specific user so that the server 2 can prepare and transmit a new UIO with the message to the specific user.

Figure 7:
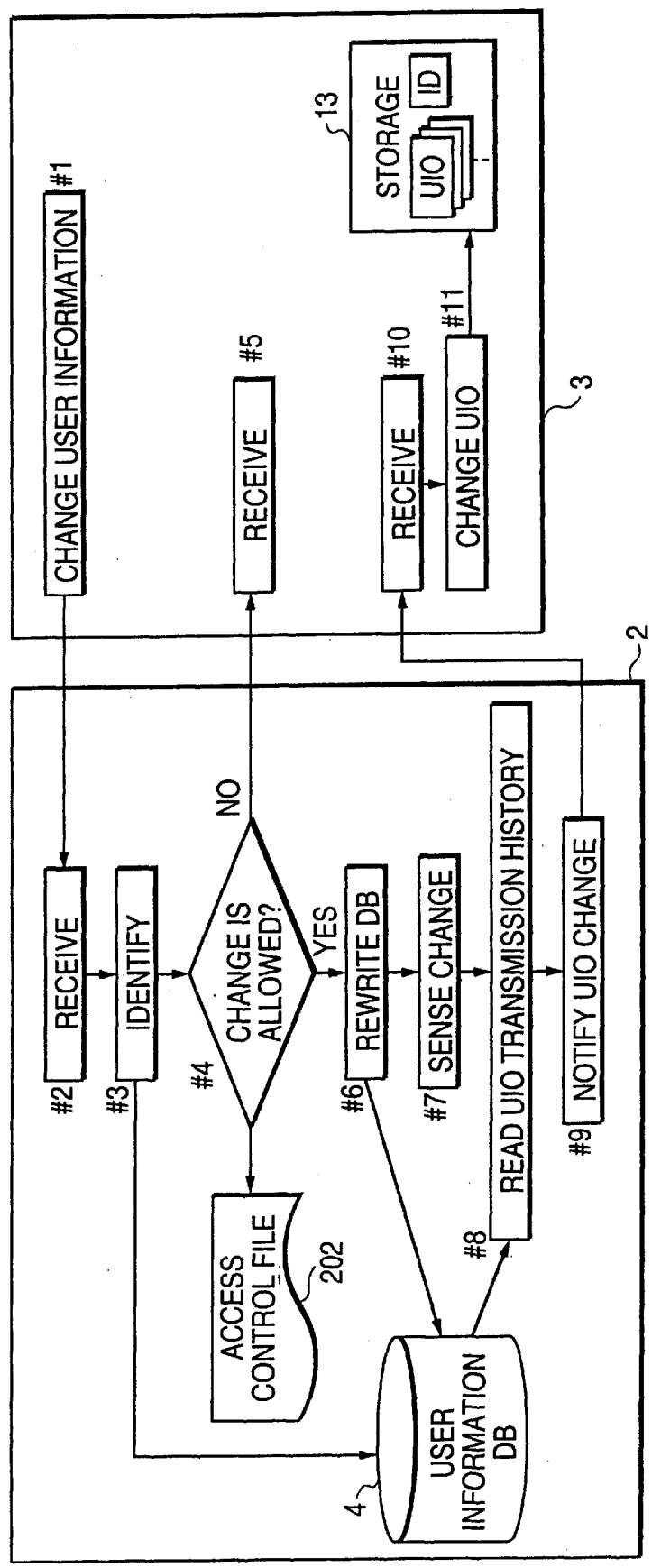
FIG. 7 is a flowchart showing steps in a process whereby user information stored in the server depicted

In FIG. 7 shows an example of user information being changed or updated by the system depicted in FIG. 5. A request to change information (#1 in FIG. 7) is sent to the server 2 by the processing module 11 and the information registering module 301 of the user terminal 3. The change request (#1) contains an item of user information to be changed, and also an attribute value of the item.

The change request is received by the server 2 (#2) where the identification module 9 verifies the authenticity of the request. The identification module 9 identifies the user by checking the user information DB 4 (#3). When the identification module 9 identifies the user, a notification is sent to the access controller 201.

The access controller 201 determines whether or not the change request has been issued by the providing user of the user information and is permitted to make such changes in accordance with settings in the access control file 202 (#4). When the access controller 201 judges that the change request is not permitted, the access controller 201 notifies the user terminal 3 (#5) with a message that indicates the changes are not permitted. However, if the access controller 201 determines that the change request is acceptable, the information management module 5 (#6) is set to receive new user information.

Next, the information management module 5 modifies the corresponding new data into the user information DB 4 upon receipt of the notification (#6). When the update notification module 7 detects a change in the user information DB 4 (#7), the update notification module 7 then identifies destinations of receiving users where previous UIOs were previously transmitted by reading (#8 in FIG. 7) the data in UIO transmission history (FIG. 4). Next, the update notification module 7 notifies corresponding identified receiving users at the user terminal 3 (#9) that changes have been made in a previously transmitted UIO and identifies the item name where information has been changed and also identifies the corresponding attribute value.

Upon receipt of the change notification of the UIO by the user terminal 3 (#10), the UIO updater 14 retrieves the identified UIO stored in the storage 13 and updates the attribute value of the relevant item of the UIO (#11).

Alternatively, the information management module 5 may be configured such that it does not continuously monitor updating of UIOs. For instance, the UIO updater 14 of the user terminal 3 may be configured to periodically check for changes in the user information DB 4 in the server 2 at pre-selected time intervals. In this case, at the pre-selected time interval, the UIO updater 14 transmits an inquiry to the update notification module 6 of the server 2 for information concerning user information changes. In response to the inquiry sent from the UIO updater 14, the update notification module 6 confirms changed in the user information DB 4, and notifies the user terminal 3 when the changes were made in the user information DB 4. If updated information is required, updated information is transmitted to the user terminal 3.

Figure 8:
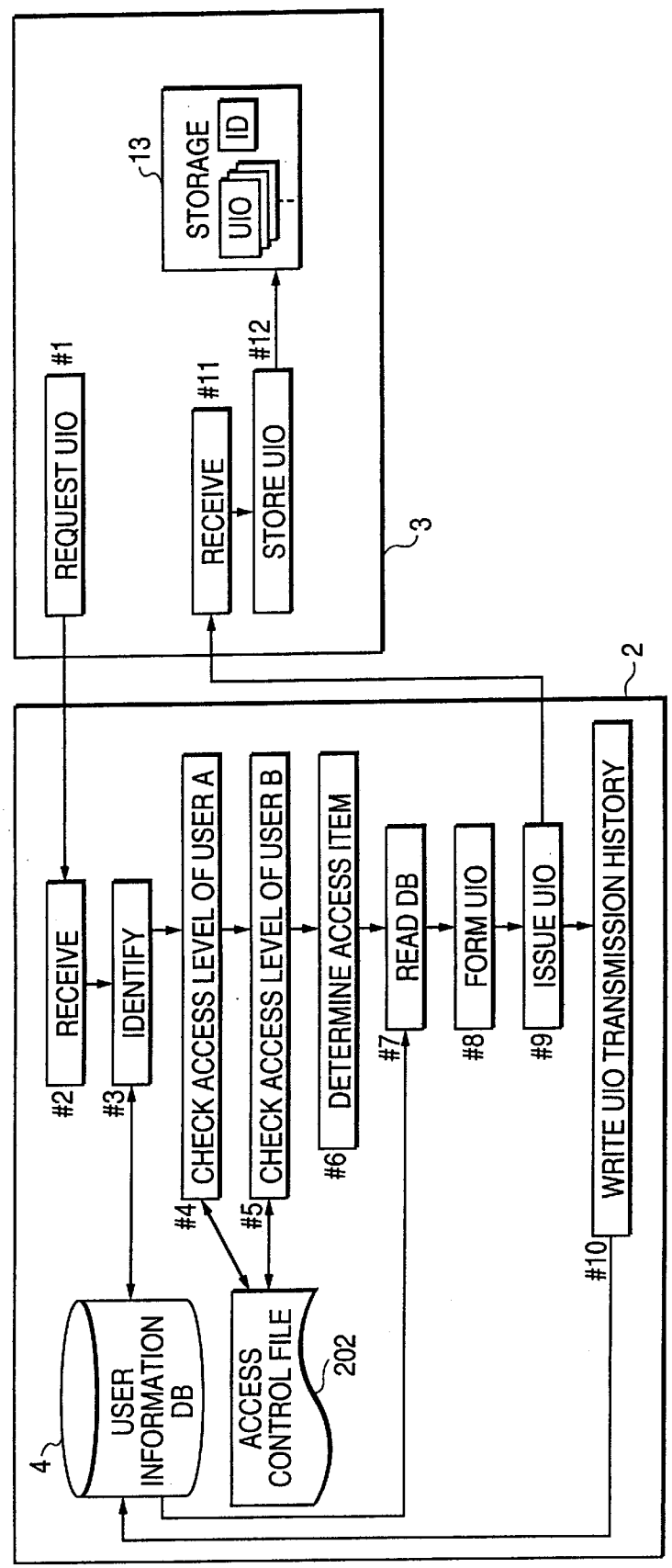
FIG. 8 is a flowchart showing steps in a process of the system depicted in FIG. 5, whereby user information is compiled into an UIO and issued (transmitted) to another user.

FIG. 8 shows an example of an UIO issuing process where the access control file is used to determined the access level of a receiving user who has either requested an UIO or is designated by another to receive an UIO, as performed in the system depicted in FIG. 5. For instance, the user "B" is a receiving user who requests the UIO of the user "A", a providing user. The request (#1 in FIG. 8) for the UIO of the user A is transmitted from the user terminal 3 of the user B to the server 2 by the processing module 11.

The request from user B is received together with identification information of the user B by the server 2 (#2 in FIG. 8). The identification module 9 of the server 2 identifies the user B (#3) by referencing the user information DB 4. If identity is confirmed, then identification module 9 transfers the request to the access controller 201.

The access controller 201 refers to the access control file 202 having access levels previously defined by user A (#4) and also refers to the access levels of the user B (#5). The access controller 201 then compares the access control files of each party to determine an UIO description item (#6). When the description items are determined, the access controller 201 communicates with the information management module 5 to read out the content of the. determined description item.

The information management module 5 reads the attribute value of the description item related to the user A (#7), and then transmits the read attribute value to the UIO compiler 6. The UIO compiler 6 forms an UIO (#8), and then transmits the new or updated UIO to the user terminal 3B (#9). After the UIO is issued, the information management module 5 writes into the user information DB 4 new issue history information relating to the just transmitted UIO including an issuing destination and issuing content (#10). Meanwhile, the user terminal 3 stores the issued UIO in the storage 15 (#11 and #12).

In accordance with the above described embodiment, the information to be disclosed can be limited in accordance with the access control information determined by a providing user who wishes to limit the access to the information to selected receiving users. Further, the information to be disclosed in an UIO can be limited by the providing user in a variety of ways, for example, in accordance with common interests between a providing user and the receiving user. For instance, the providing user can designate a common hobby or the like as a definition of an access level allowing those with such a common hobby or the like access to an UIO disclosing information about the providing user.

Figure 9:
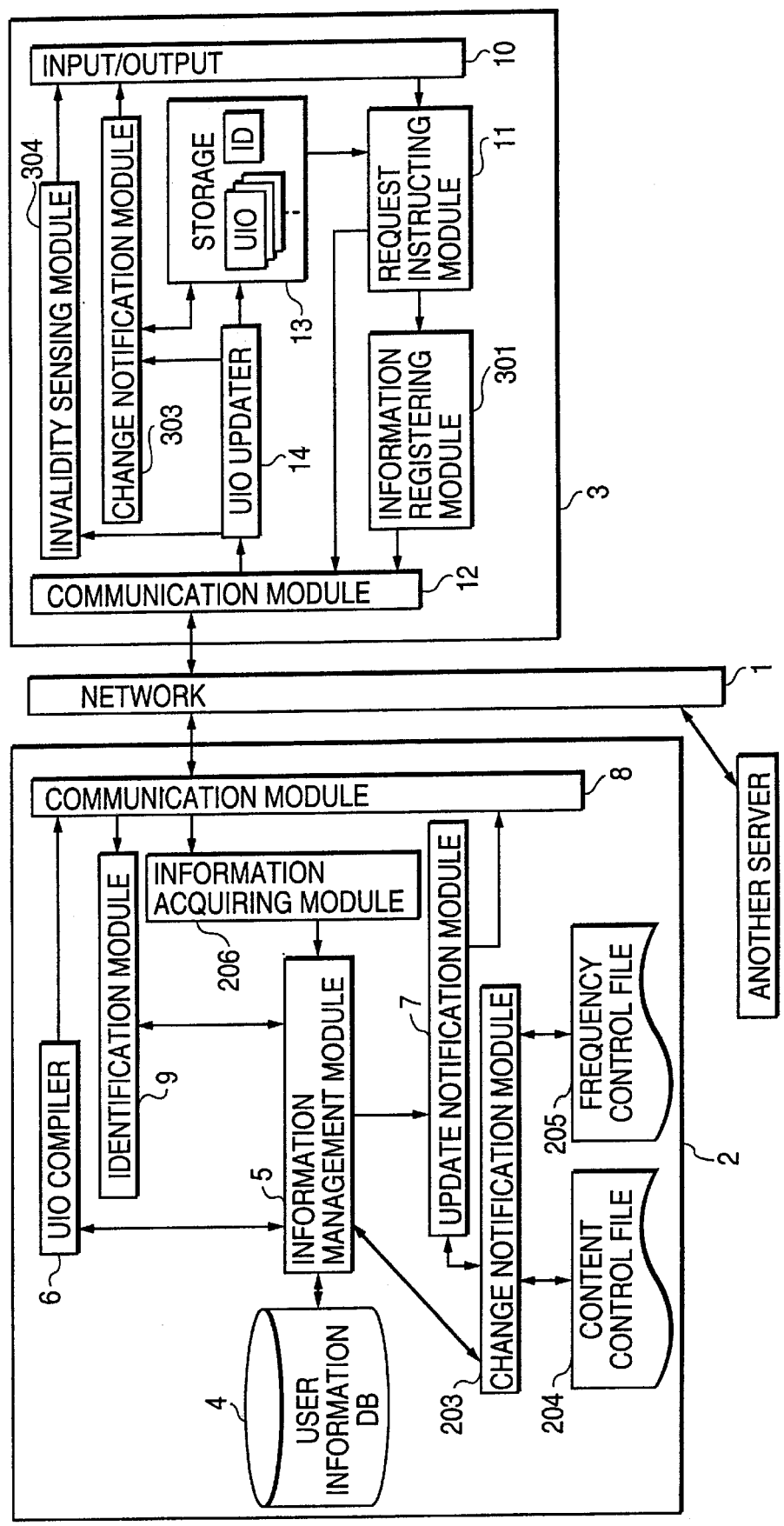
FIG. 9 is a block diagram showing an information management system that includes a server and at least one user terminal which communicate with one another over a network in accordance with a third embodiment of the present invention.

A third embodiment of the present invention is described below with respect to FIGS. 9, 10 11 and 12. The third embodiment has many of the features discussed above in both the first and second embodiments. FIG. 9 is a block diagram showing an information management system according to the third embodiment of the present invention. The information management system shown in FIG. 9 includes: a change notification control module 203; a content control file 204; a frequency control file 205; and an information acquiring module 206. Features of the server 2 also include the features described above with respect to the first embodiment, as depicted in FIG. 9. Further, the user terminal 3 in FIG. 9 includes a change notifying module 303 and an invalidity sensing module 206 in addition to the features described above with respect to the user terminal 3 of the first embodiment. It should be noted that the user terminal 3 in this third embodiment also includes the information registering module 301 of the second embodiment.

In the system of the third embodiment, if a providing user changes user information, the providing user may set a timing interval for updating an UIO when user information has been changed and may also designate which receiving users are receive updated changes in user information. Each providing user may further designate that a receiving User who was previously allowed access to an UIO now be denied further access to user information in an UIO.

As was described above in the description of the first. embodiment and the user information file depicted in FIG. 2, the user information file includes both static and dynamic information. The static information typically includes seldom changed information such as a local address, hobbies, telephone number, etc. The dynamic information is constantly changing information, such as the current status of the user. For example, the dynamic information includes current network 1 logon status. Specifically, the logon status is in the form of the user's current location if logged on to the network 1. For instance, perhaps the user is on a business trip and has logged on from Japan.

The information acquiring module 206 is configured to acquire information related to a user's activity via the network 1 and the communication module 8. The information acquiring module 206 determines some of the dynamic information described above, specifically the current logon information concerning the user. The dynamic information is then transferred to the information management module 5 of the server 2. For instance, the information acquiring module 206 determines: whether or not the user's user terminal is connected to the network 1; which communication means is being used to log on to the network 1; and which service is being used to log on. Also, the information acquiring module 206 also acquires service information relating to other registered user terminals. Upon receipt of a signal from the information acquiring module 206, the information management module 5 updates the user information in the user information DB 4.

The information acquiring module 206 works in real time to continuously update dynamic user information.

When a change is made in the content of the user information (dynamic or static), the change notification control module 203 determines which previous receiving users need to have updated UIOs transmitted thereto in a manner similar to that described above with respect to either the first or second embodiments.

When a providing user makes changes or causes changes to be made in their corresponding user information, there may be instances where the providing user wants to transmit updated UIOs to a first receiving user but not to a second receiving user. Also, when a change in user information occurs as a result of changes in dynamic information (i.e. logging on and logging off), it might not be necessary to send updated UIOs immediately. In the third embodiment of the present invention, timing of notification of updated information may be predetermined.

In the third embodiment, a portion of the user information stored in the user information DB 4 includes a notification destination and a notification frequency, as shown in FIG. 2. The notification destination and notification frequency are for the purpose of making updated UIOs in response to changes in user information, as is described in greater detail below. The change notification control module 203 creates and maintains a content control file 204 and a frequency control file 205 (described below) on the basis of the notification destination and the notification frequency stored in the user information DB 4. When a change is made in the user information, the change notification control module 203 determines the change notification destination and the timing or time interval(s) when updates of UIO are to be transmitted. The updated UIOs are transmitted in accordance with data stored the content control file 204 and the frequency control file 205 in combination with determinations made by the update notification module 7. The update notification module 7 receives a receiving user list from the information management module 5. The receiving user list includes information about each UIO sent to receiving users. Based upon the information in the list of receiving users, the information in the content control file and the frequency control file, recipients of updated UIOs are determined.

Figure 10:
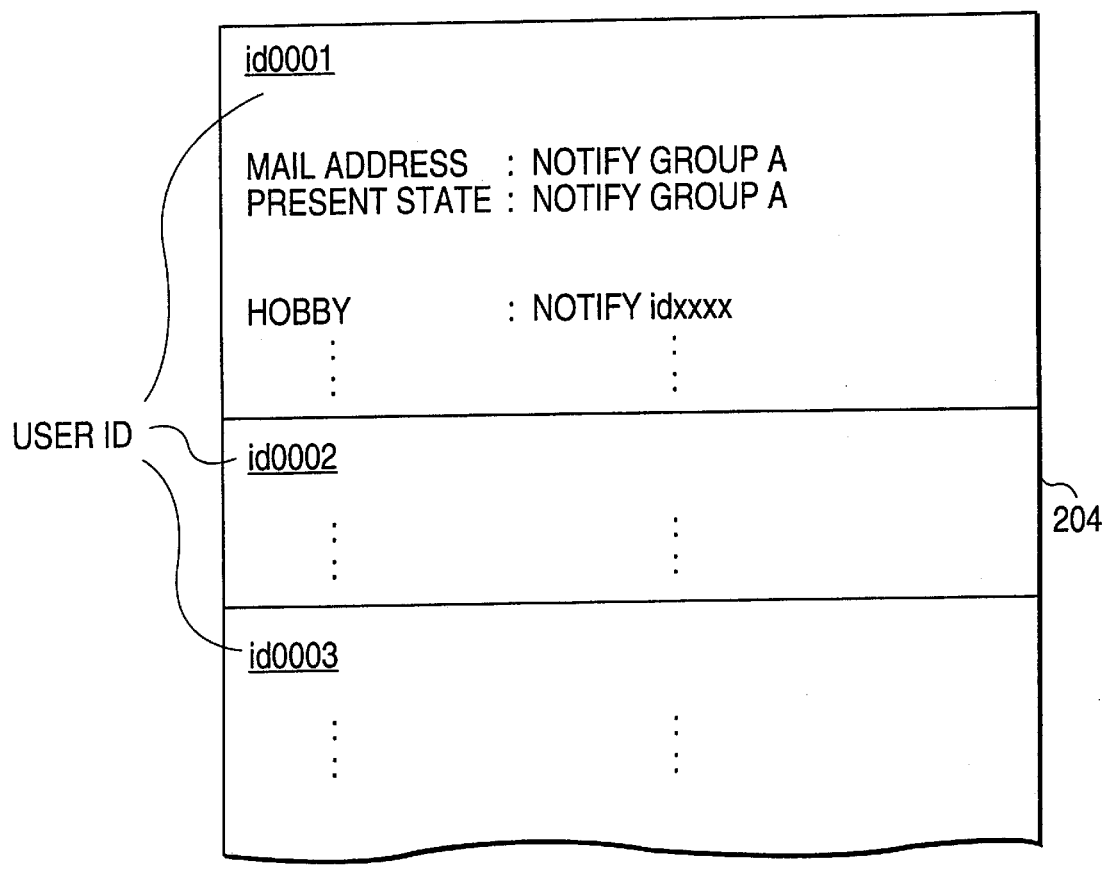
FIG. 10 is a diagram showing an example of a content control file depicted in FIG. 9.

FIG. 10 shows an example of a content control file 204 which is actually stored in the user information DB 4, but is depicted in FIG. 9 as being apart from the DB 4 in order to better explain the present invention. The change notification module 203 creates and maintains the content control file 204. As shown in FIG. 10, it is possible for a providing user to designate receiving users or groups of users who are to be notified when changes are made to corresponding data items from user information. Specifically, for each item in the user information file, a user or groups of users may be specified for notification of changes in that data item. For instance, in FIG. 10, if the mailing address of the providing user is changed, all receiving users in group A will be notified of such a change.

The designations in the content control file 204 may be changed in a similar manner to the above-explained access control file 202. The designations in the content control file 204 are changed by utilizing the information registering module 301 of the user terminal 3.

Figure 11:
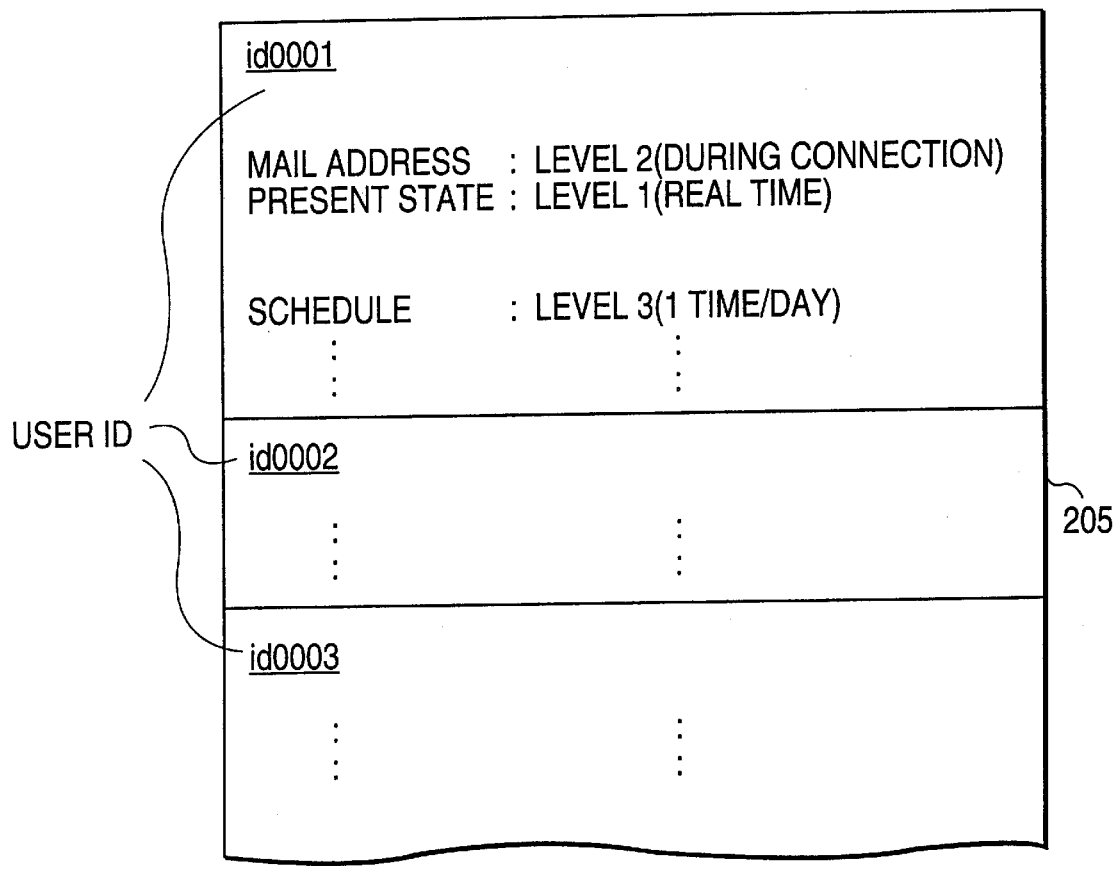
FIG. 11 is a diagram showing an example of a frequency control file depicted in FIG. 9.

FIG. 11 shows an example of the frequency control file 205 which is stored in the DB 4, but is depicted separately in FIG. 9 to better illustrate the present invention. The frequency control file 205 is by the change notification. control module 203 via the information management module 5. In FIG. 11, notification set by each providing user in order to define a time interval for updating an UIO in response to changes in user information. For instance, as indicated in FIG. 11, the mailing address is designated as being updated in accordance with level 2. Level 2 designates that if changes are made in a data item, then update notification is to be sent to designated receiving users when those designated receiving users log on to the network 1. Designated receiving users are determined by the data in the content control file and the determinations of the user information management module 5.

Similar to the above-described access control file 202 and content control file 204, the frequency control file 205 is set and updated when a providing user employs the information registering module 301 of the user terminal 3.

As with the second embodiment described above, when the UIO updater 14 receives a change notification, the information corresponding to the previously received UIO is updated in the corresponding user terminal 3. Further, the user at the user terminal 3 is notified of the updated UIO by any of a variety of means. For example, in this embodiment, when the UIO updater 14 receives update notification, a signal is transmitted to the change notifying module 303. The change notifying module 303 outputs a predetermined notification signal that alerts the user to the receipt of a change in UIO information. The notification signal may be in the form of a color in a window of the corresponding UIO is displayed in a reverse mode or different color from other non-updated UIOs when the UIOs are displayed. Alternatively, the color of only a display portion of an updated attribute (data) within the updated UIO may flicker or blink. Also, the notification signal could be non-visual, for instance, a sound.

Another feature of the third embodiment of the present invention is an invalidity sensing means. Any providing user may change user data and may also change access levels, as described in the second embodiment. Further, a providing user may update the content control file such that a receiving user is no longer allowed access to information via an UIO. In any of these instances and other instances, the invalidity sensing module 304 determines invalidity of an UIO stored in the user terminal 3, and notifies the user of the detected invalid UIO. For example, information for discriminating invalidity of a UIO that was previously transmitted to a receiving user is contained in the user information DB 4, and the respective providing users can set the access permissibility of their user information. In determining invalidity of a previously transmitted UIO, the following discrimination information may be used to determine the invalidity: the data itself may be outdated making it invalid; information relating to timeliness of data may indicate invalidity; other time related restrictions may have been placed on the information; and changes in user information made by a providing user may alter accessibility of information for a specific receiving user or group of receiving users. Notification of the invalidation of UIO is transmitted appropriate user terminals in a manner similar to that of updates to UIO information.

The invalidity sensing module 304 receives the notification from the UIO updater 14, and checks whether or not an UIO has become invalid. The invalidity check is carried out every time a change notification is received from the server 2, or may be regularly performed at predetermined time intervals, or may be executed upon receipt of instructions by a user. When the invalidity sensing module 304 detects an invalidated UIO, this invalidity sensing module 304 notifies the corresponding user using the user terminal 3 of the invalidated UIO via the input/output 10. The notification may be visually indicated on the display screen, or may be in the form of a sound.

The user can immediately recognize from the notification from the invalidity sensing module 304 that an UIO has been invalidated from the user terminal 3. Thereafter, the user may delete the invalidated UIO, so. that the storage resources can be more effectively used.

Figure 12:
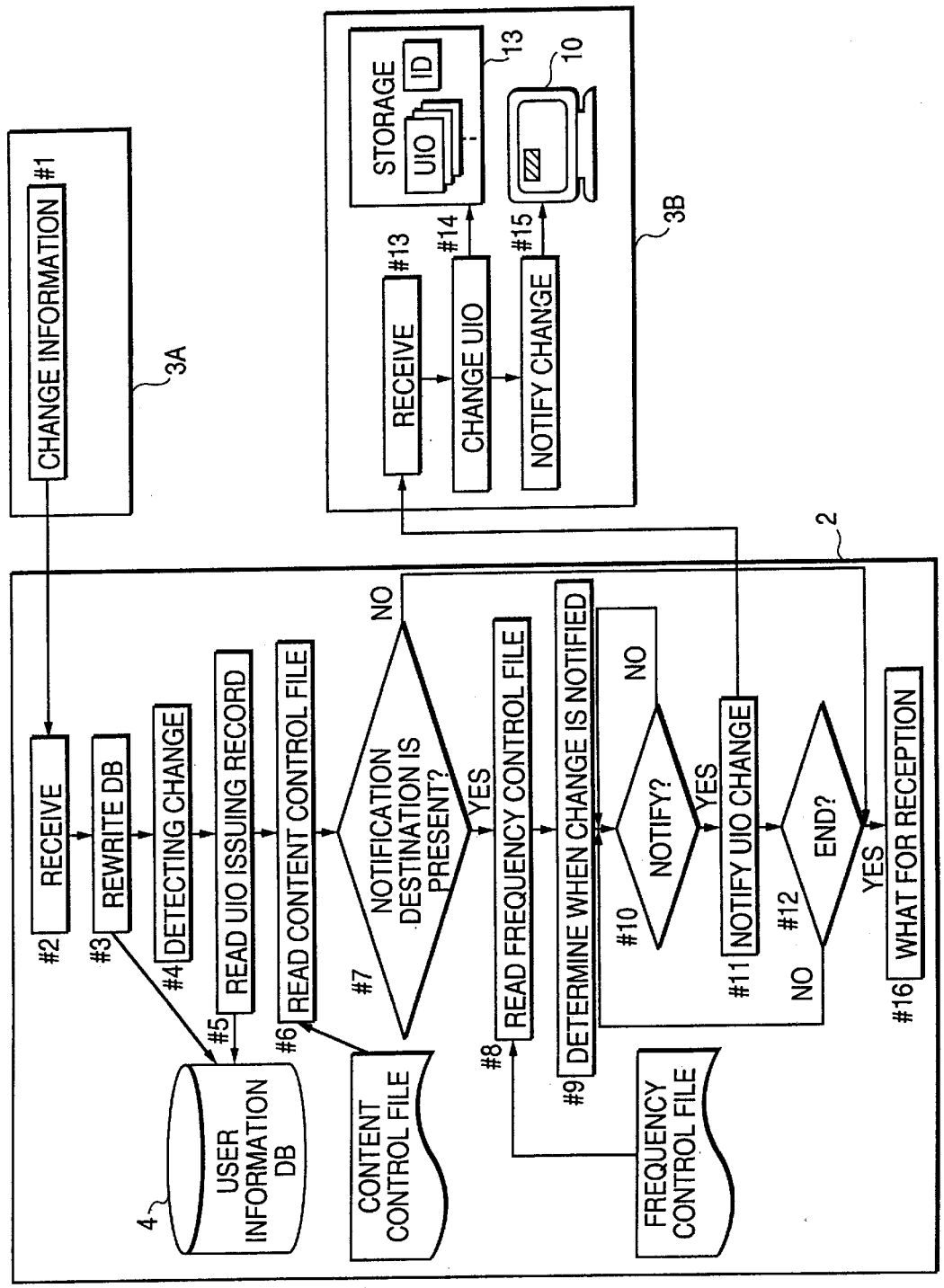
FIG. 12 is a flowchart showing a process conducted in the system depicted in FIG. 9, whereby a user terminal in notified of changes in user data of another user's user information file.

FIG. 12 is a flow chart representing one possible example of UIO change notification process in the case where change notification is carried out. For the sake of more easily understanding the invention, a user A is connected to the network 1 via a terminal 3A and the user A is to be notified of changes to user information relating to user B.

When the user terminal 3A of the user A is connected to the network 1 (#1), the information management module 5 is notified that the user A has logged on by the information acquiring module 206 (#2). The information management module 5 save information into the user information DB 4 indicating a connection state of the user A as "connected" (#3). The update notification module 7 senses a change in the user information DB 4 (#4), and requests that the information management module 5 identify which UIO have been previously transmitted to the user A (#5).

Next, the change notification control module 203 refers to the content control file 204 (#6) to identify information issued in UIOs relating to both the user A and the user B. In box (#7) in FIG. 12, a determination is then made whether or not the content control file indicates that the user B is to be notified of the change in the connection condition of user A. If no, then the process moves to box (#16). If yes, the process goes to box (#8) in FIG. 12. In box (#8), the change notification module 203 refers to the contents of the frequency notification control file 205 of the user B (#8), and determines when notification of changes in the connection condition are to be transmitted. Thereafter, the change notification module 203 transmits change notification time to the update notification module 7 (#9).

In boxes (#10, #11, #12) in FIG. 12, the update notification module 7 checks to see if it is time to notify the user terminal 3B of changes to information concerning user A, and transmits notification accordingly based upon the determinations made by the change notification module 203. Then, in box (#16), the update notification module 7 is returned to a waiting state to wait for further update notification.

Upon receipt of the change notification (#13), the user terminal 3B of the user B writes the change in UIO into the storage 13 by means of the UIO updater 14 (#14). The change notifying module 303 notifies the user B of the change in the UIO of the user A (#15).

In accordance with the above described third embodiment, the timing notification of changes to user information can be controlled and predetermined. As a result, the extra changes in information need not be notified to a person or user who is not specified to receive such updated information. Only predetermined users will be notified of specific types of updated or changed information.

Figure 13:
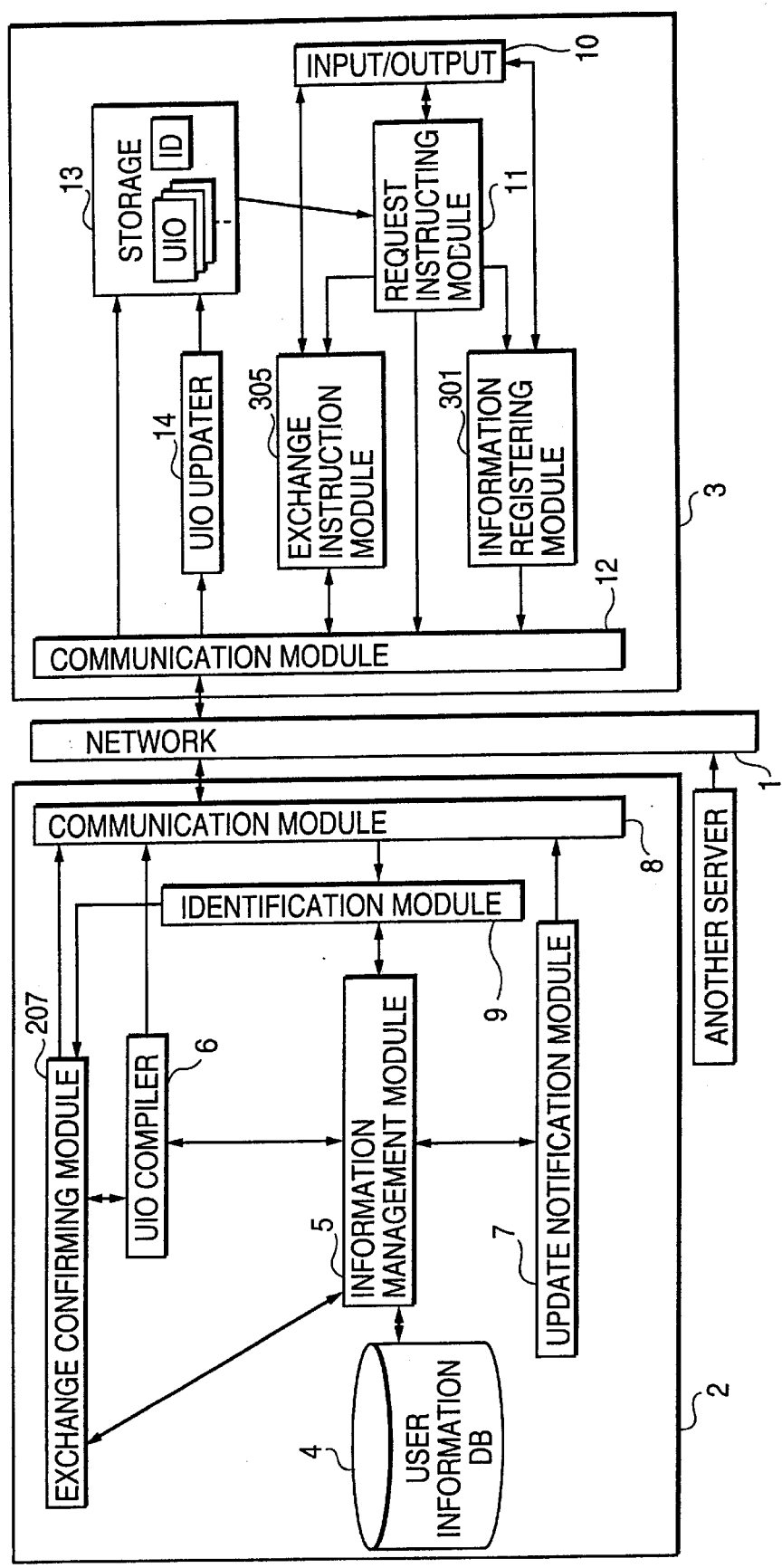
FIG. 13 is a block diagram showing an information management system that includes a server and at least one user terminal which communicate with one another over a network in accordance with a fourth embodiment of the present invention.

A fourth embodiment of the present invention is described below with respect to FIGS. 13, 14, 15 and 16. FIG. 13 is a block diagram showing an information management system according to the fourth embodiment of the present invention. The fourth embodiment is similar to the first embodiment depicted in FIG. 1 and generally has all the features of the first embodiment but includes several additional features. Specifically, the server 2 of the information management system of FIG. 13 further includes an exchange confirmation module 207. As well, the user terminal 3 is generally the same as that depicted in FIG. 1 but further includes an exchange instruction module 305. The user terminal 3 also includes the information registering module 301, which was described in the user terminal depicted in FIG. 5 in the second embodiment of the present invention.

In the system in accordance with the fourth embodiment, each user may designate other users he or she wishes to exchange information in the form of UIOs. Therefore, one user can exchange UIOs with other designated users if the other designated users agree to exchange UIOs. When a designated user agrees to exchange, then UIOs are mutually exchanged. However, if a designated user declines to exchange UIOs then no UIO is exchanged between the declining designated user and the user making the initial request for exchange.

As was explained above, each providing user registers with the server 2 in a manner described above with respect to the first and second embodiments, designating user information. At any time, a providing user may request an exchange of UIOs with one or more designated users. In the server 2, the exchange confirmation module 207 confirms the designated user's willingness to exchange UIO in response to the request from the providing user. As a result, users can mutually exchange UIOs on the network with other users of their choice when such a request is made. As a result, if a user does not wish to receive any UIOs for a limited time period for some reason, the user can express a negative willingness to exchange. In response to a negative willingness to exchange, the exchange confirmation module 207 causes a cancellation of an exchange of UIOs.

Features of the server 2 are described below and are in addition to the features of the server described above with respect to the first embodiment. The exchange confirmation module 207 is configured to notify a second user terminal that there is a request for exchanging UIOs from a first user terminal, where the first user terminal has designated the second user terminal as a user to exchange UIOs with. The exchange confirmation module 207 further processes the response from the second user terminal with respect to a willingness to exchange UIOs and transmit the response back to the first user terminal.

With respect to the fourth embodiment of the present invention depicted in FIG. 13, the following two examples of UIO exchanges between a plurality of users are provided.

(a) A case where specific user(s) are designated for exchanging UIOS:

A user has corresponding user information entered in the DB 4 in server 2, and now requests exchange of UIOs designating a specific designated user or specific group of users.

The server 2 receives from a user terminal 3 a request for exchange of UIOs from the requesting user to a designated user or designated users. The request includes designated user information identifying, for instance, the name or ID of the designated user or users. The identification module 9 identifies the user making the request and notifies the exchange confirmation module 207 of the request together with the identified user and the name of the designated user or users. The exchange confirmation module 207 receives the information and notifies (interrogates) each designated user's user terminal to learn the willingness exchange of each user. Subsequently, the exchange confirmation module 207 receives responses to the interrogation via the identification module 9. The exchange confirmation module 207 is configured to wait for a responses) from the designated user(s) for predetermined time or may alternatively wait for responses from all designated users.

In response to positive responses, where some designated users are willing to exchange UIOs, the exchange confirmation module 207 notifies the compiler 6 to issue UIO's so that each confirming designated user and the requesting user have each other's UIO. In other words, UIO's are mutually exchanged among designated users and the requesting user who are willing to exchange.

(b) A case where users are grouped for exchange of UIOs by, for instance, a request from a providing user to send UIOs to all other users who have a common link like a keyword that is not necessarily in respective user information files.

The server 2 receives exchange request together with a common keyword from several providing users. The identification module 9 identifies each of the providing users, and then notifies the exchange confirmation module 207 of the exchange requests and the keyword. The exchange confirmation module 207 recognizes the users who sent the exchange requests together with the common keyword and identifies other users who have entered a common keyword in their requests to exchange UIOs thus defining an exchange group. The exchange confirmation module 207 requests the UIO compiler 6 to issue UIOs to each of the users in the newly defined exchange group.

The exchange instruction module is described in greater detail below.

(a) In the above case where a user designates a specific user or users who are to receive an UIO or UIOs, by entering information in the input/output 10. The exchange instruction module 305 accepts the input of information, for example, the name that identifies a separate, designated user or users who is to receive the request and then transmits the specific information together with the exchange request of the UIO to the server 2. Thereafter, the designated user's exchange instruction module 305 receives from the server 2 an interrogation. Specifically, the interrogation asks whether or not the user is willing to exchange UIOs. The exchange instruction module 305 of the designated user's user terminal then outputs to the input/output 10 the request and waits a predetermined time for a response from the user. Thereafter, the response to the request to exchange of UIOs may be transmitted to the server 2.

(b) In the above case that users are grouped together by a keyword to exchange UIOs:

From the providing user's terminal, the exchange instruction module 305 receives an input from the user of, for example, a keyword, which is to be used as a basis for identification of users among whom UIOs are to be exchanged. The exchange instruction module 305 sends an exchange request with identification information of the requesting user to the server 2. The keyword provides the only means for defining an exchange group since not specific users are designated. Various keywords may also be used to define a designated exchange group. For example, an user ID of the user who first requests an exchange may be the keyword. Further, the keyword might be a channel name of a chat room or IRC (Internet Relay Chat service) and the time of a chat. Confirmation of those who exchange the UIOs is possible by using the IRC. The users who confirm willingness to exchange UIOs transmit their willingness requests to the server 2 along with the keyword in order to become part of the designated exchange group.

Figure 14:
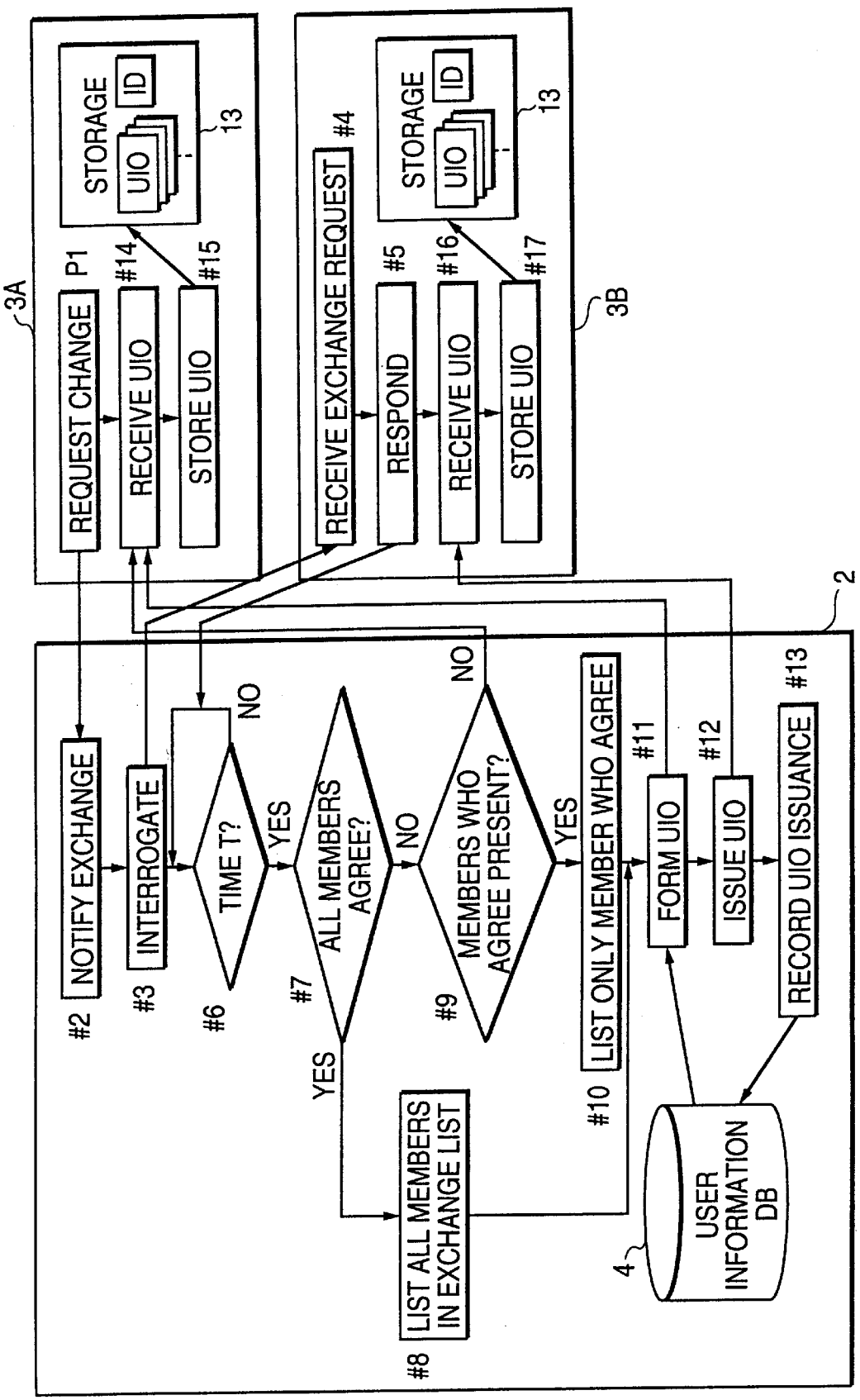
FIG. 14 is a flowchart illustrating an information exchange process of a UIO (user information object) by the system depicted in FIG. 13.

FIG. 14 shows an example of the UIO exchange process executed in the case where a user A designates other users B, C, D as designated users with whom A wishes to exchange UIOs. For the sake of an easy understanding of the drawing, FIG. 14 shows only user terminals 3A and 3B.

First, the exchange instruction module 305 in the user terminal 3A transmits a request for exchange of UIO to the server 2 (#1). The request for exchange includes names of users designated as designated users (user B, C and D), and a user ID of the requesting user (user A). When the requesting is recognized, the identification module 9 of the server 2 notifies the exchange confirmation module 207 (#2) of the exchange request and the names of the users (B, C and D).

The exchange confirmation module 207 acquires IDs of the users B, C, and D designated via the information management module 5, and interrogates the uses B. C, and D as to whether or not UIOs are exchanged (#3). Next, the exchange confirmation module 207 receives responses sent from the users B, C, and D during a predetermined time period T (#4, #5, #6). After time T has passed, the exchange confirmation module 207 judges as to whether or not all of the users agree to exchange the UIOs (#7). In such a case that all of the users agree to exchange the UIOs, all of the designated users (users B, C, and D) and The receiving user (user A) are added to an exchange list #8). In the case that not all of the users agree to exchange the UIOs, the exchange confirmation module 207 recognizes only those users who have responded. If there is no user who agrees to exchange the UIO, then the exchange confirmation module 207 transmits this response to the requesting user A at user terminal 3A (#9). In the case where there are users who agrees to exchange the UIO, after time T has passed, the users who agree to exchange the UIO and the exchange request issuer are added to the exchange list (#10). It is now assumed that the user B sends an agreement response.

Next, the exchange confirmation module 207 instructs the UIO compiler 6 in such a manner that the UIOs are issued between the user A and the user B on the exchange list (#11). The UIO compiler 6 issues UIOs in response to the instruction (#12). Specifically, an UIO based upon user A's user information is transmitted to user B and an UIO based upon user B's user information is transmitted to user A. After the UIO has issued, the information management module 5 writes issue histories of UIOs into the users information DB 4 (#13).

Both the user terminals 3A and 3B receive the issued UIO, respectively (#14), and store the UIO into the storage 13 (#15).

In accordance with the fourth embodiment, the user information can be fairly exchanged among a plurality of users via the network. For example, only those who are willing to exchange UIOs will do so.

A fifth embodiment of the present invention is now described below with respect to FIGS. 15 and 16.

Figure 15:
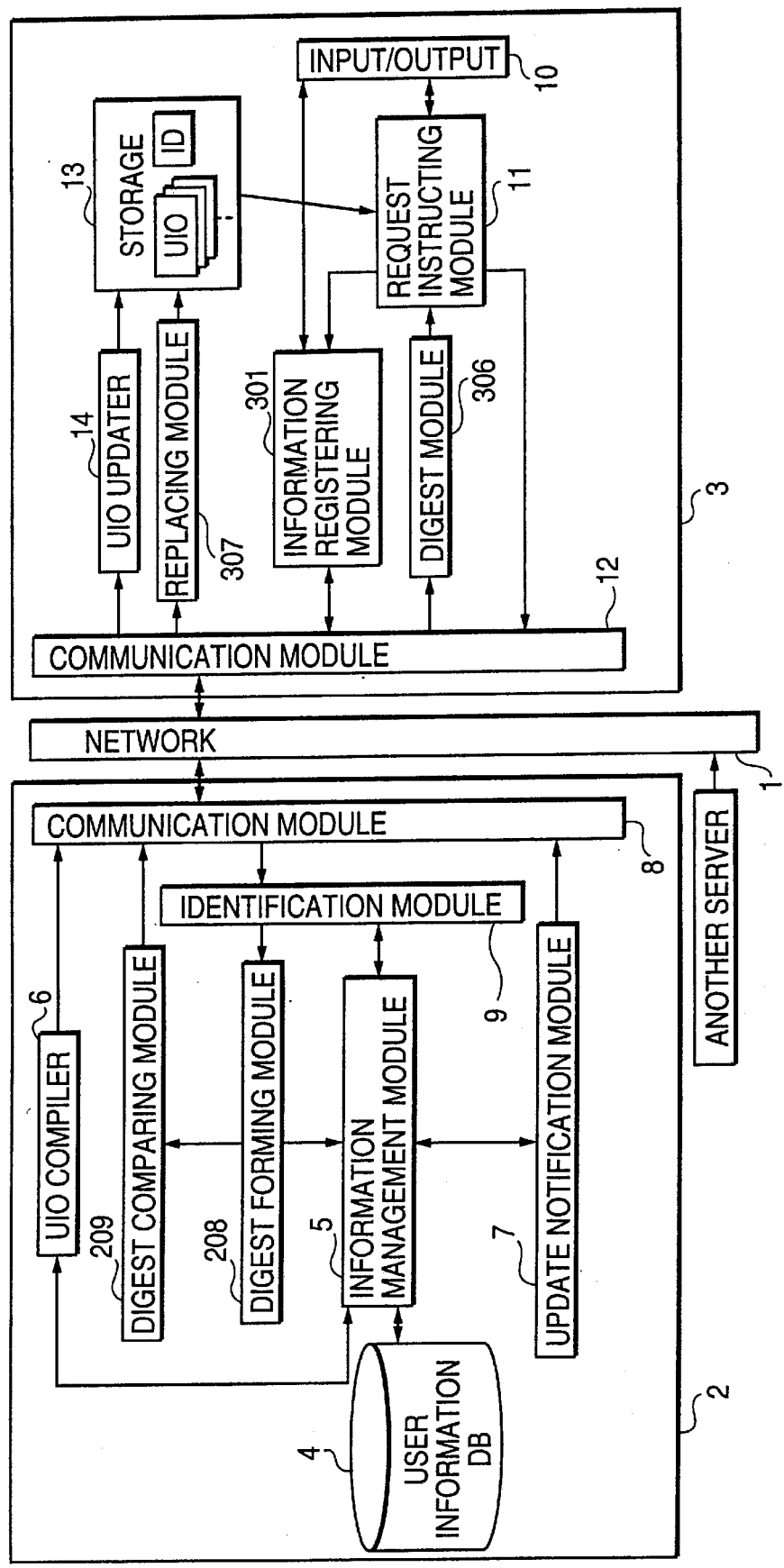
FIG. 15 is a block diagram showing an information management system that includes a server and at least one user terminal connected thereto in accordance with a fifth embodiment of the present invention.

FIG. 15 is a schematic block diagram of an information management system according to a fifth embodiment of the present invention. In the information management system of FIG. 15, a digest forming module 208 and a digest comparing module 209 are added to the server 2 of the first embodiment. As well, in the fifth embodiment, a digest module 306 and a replacing module 307 are added to the user terminal 3 in the first embodiment. The user terminal 3 includes the information registering module 301 discussed in the second embodiment. In the fifth embodiment, a digest is maintained of received UIOs in the user terminal and, a similar digest of transmitted UIOs is maintained in server. These digests are compared with each other in a manner described below. A determination is regularly made as to whether or not the contents included in a received UIO stored by a user is the same as the contents of information stored in the server.

In the server 2 in FIG. 15, the digest forming module 208 (a second abstract forming means) of the server 2 digests user information stored in the user information DB 4 by using a digest forming algorithm (for example, well known ciphering algorithms could be used, such as MD 5, etc.). When a digest and an object number of a digested UIO are received from the user terminal 3, these digest and object number are identified by the identification module 9, and a digest forming instruction is sent to the digest forming module 208.

The digest forming module 208 transmits the object number of the UIO to the information management module 5, and reads out both an issue history of an UIO corresponding to the transmitted object number, and an user attribute of the user information file corresponding to the UIO from the user information DB 4 via the information management module 5. Subsequently, the digest forming module 208 digests the notified UIO by using the digest forming algorithm, and then transmits the digested UIO together with the digest received from the user terminal 3 to the digest comparing module 209.

The digest comparing module 209 (abstract comparing means), receives information about both the digest sent from the user terminal 3 and the digest formed by the digest forming module 208. The digest comparing module 209 compares the transmitted digest with the formed digest, and sends the comparison result to the user terminal 3.

As previously explained, since the content of the UIO on the server side is compared with the content of the UIO on the user terminal side, such a check can be made as to whether or not the UIO stored in the user terminal is forged. Also, the coincidence between the description contents can be checked by directly comparing these description contents with each other without using the digest algorithm.

Alternatively, while the digest comparing module is provided on the user terminal side, the digest formed by the server 2 is transmitted to the user terminal side, and then the both digests may be compared with each other on the side of the user terminal.

The digest module 306 (first abstract forming means) of the user terminal 3 accepts a content confirmation request for an UIO from a user, and forms a digest of UIOs stored in the user terminal 3 by employing a digest forming algorithm similar to that of the digest forming module 208 of the server 2. Furthermore, the digest module 306 transmits an object number contained in the UIO together with the formed digest to the server 2. More preferably, the comparison result of the digests transmitted from the server 2 is outputted by the digest module 306 to the output module 10. The user confirms a response result, and if required may perform a process operation, e.g., may request to issue a UIO. For example, such UIOs whose digests are not made coincident with each other are notified to the user, and then the digest module 306 may transmit a request to reissue a UIO by the user together with an object number of the UIO.

The replacing module 307 determines whether or not the UIO received by the user terminal 3 is replaced by the UIO previously stored in the storage 13. When the user terminal 3 receives the UIO, the replacing module 307 compares the object number contained in the UIO with the object number of the UIO previously stored in the storage 13, and executes the replacement in accordance with a predetermined basis if the UIO whose object number is made coincident with the object number of the UIO stored in the storage 13. Conversely, when this object number is not made coincident with the above object number, the received UIO is stored into the storage 13. A determination for the replacement of an UIO is given as follows. For example, the final updated date of the UIOs are compared with each other, and when the stored UIO is older than the received UIO, a replacement is carried out.

Figure 16:
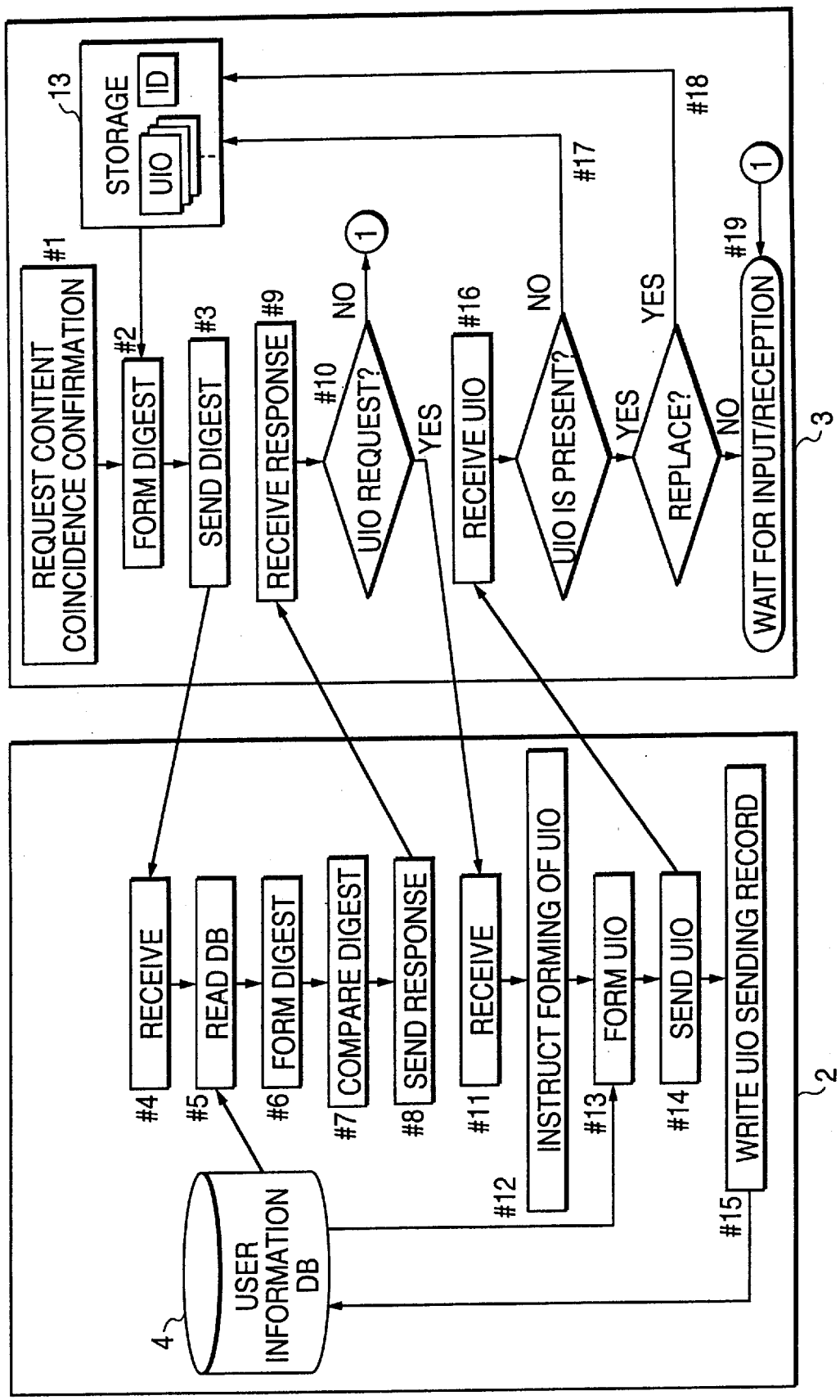
FIG. 16 is a flowchart illustrating a content confirming process and replacing process for the transmittal of a UIO (user information object) by the system depicted in FIG. 15.

FIG. 16 represents a content confirming process of an UIO and a replacement process thereof.

When a content confirmation request of a UIO is issued from a user (#1), the digest module 306 forms a digest of stored UIOs. (#2), and transmits the formed digest together with an object number to the server 2 (#3). Alternatively, a user may designate a digest forming subject.

Upon receipt of the digest, the server 2 identifies. the request issuer (#4), and notifies the transmitted object and the transmitted digest number to the digest forming module 208. The digest forming module 208 reads out an issue history of a UIO and a user attribute, corresponding to the object number of the UIO, from the user information DB 4 (#5), and then forms a digest on the basis of the read information (#6).

Next, the digest forming module 208 notifies both the formed digest and the transmitted digest to the digest comparing module 209. The digest comparing module 209 compares the notified digest on the side of the user terminal 3 with the digest on the side of the server 2 (#7), and then transmits the comparison result to the user terminal (#8).

When the comparison result of the digest is received by the user terminal 3 (#9), the digest module 306 outputs the response sent from the server 2 to the output module 10, and determines whether or not a transmission request is made as to the UIO whose digest is not made coincident (#10). If the transmission request is issued, then the digest module 306 sends a transmission request of a UIO together with an object number of the relevant UIO. When there is no issue request, the digest module 306 is returned to such a condition that an issue request is sent from the server, and an input operation is made from the user (#19).

In the server 2 which receives the transmission request of the UIO (#11), the identification module 9 notifies the object number of the UIO to the information management module 5. The information management module 5 reads out the necessary user information on the basis of the object number, and then notifies the read necessary user information to the UIO compiler 6 (#12). On the basis of the notified user information, the UIO compiler 6 forms a UIO (#13) and then issues this formed UIO (#14). After the UIO is issued, the information management module 5 updates the issuing date of the UIO issuing day of the relevant object number (#15).

Upon receipt of the UIO by the user terminal 3 (#16), the replacing module 307 in the user terminal 3 compares the object number of the existing UIO with the object number of the received UIO (#17). When the object number of the existing UIO is not made coincident with that of the received UIO, the received UIO is stored (#17). When the object number of the existing UIO is conversely made coincident with that of the received UIO, the replacing Module 307 overwrites the received UIO on the existing UIO if the update data of the received UIO is newer than that of the existing UIO. Conversely, the replacing module 307 is returned to such a condition that an UIO is received from the server, and an UIO is entered from the user (#18 and #19).

In accordance with this fifth embodiment, it is possible to check on the distributed side as to whether or not the contents of the UIOs held by the respective users and the contents of the duplicated UIOs in the server are made coincident with the contents of the original UIOs, or are forged, defective or outdated.

Also, in the case that the same user who receives the UIO already holds the UIO, the UIOs can be replaced on a predetermined basis. Thus, storage space is not wasted, and the management workload by the user can be reduced.

Figure 17:
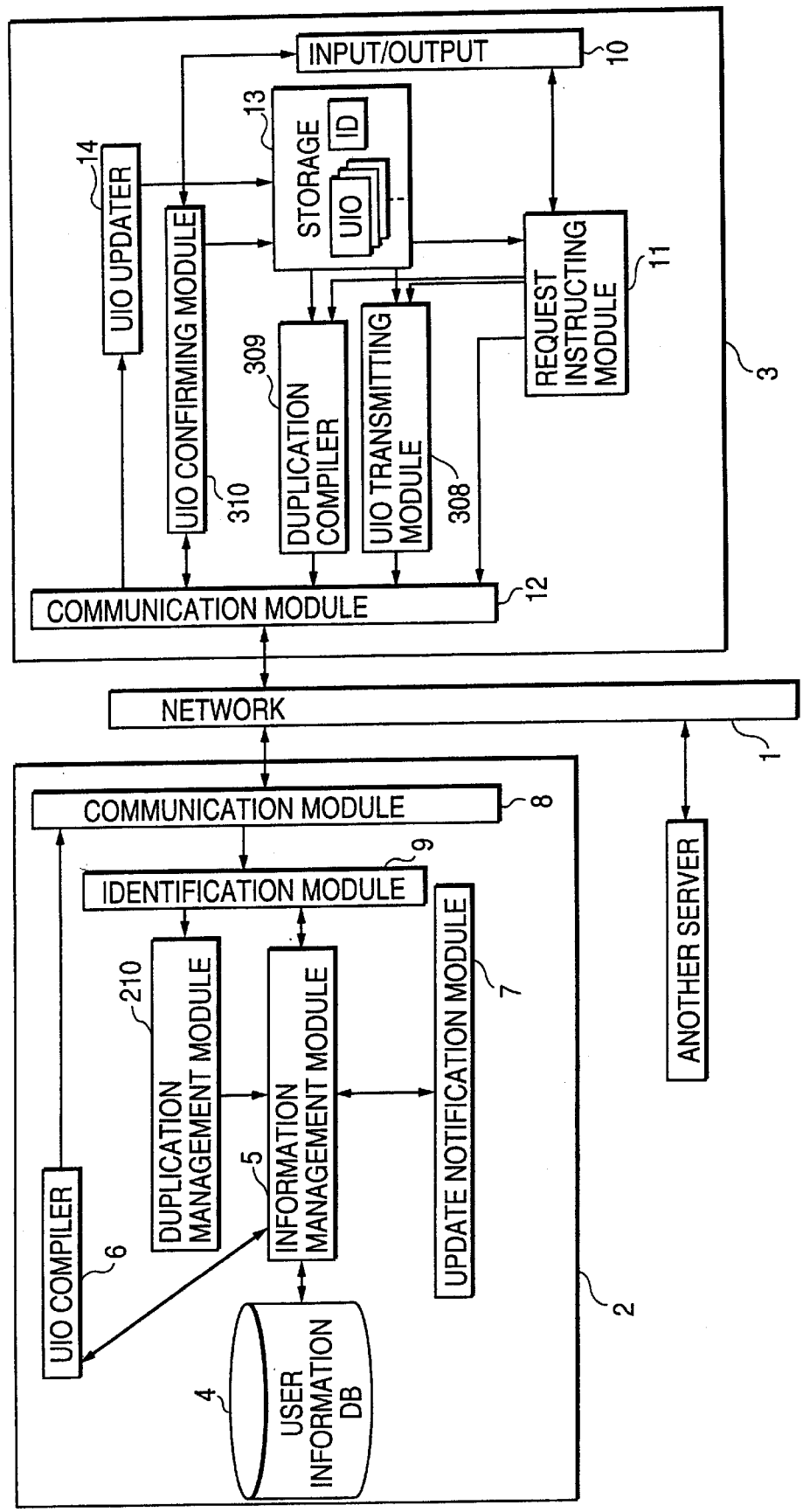
FIG. 17 is a block diagram showing an information management system that includes a server and at least one user terminal which communicate with one another over a network in accordance with a sixth embodiment of the present invention.

A sixth embodiment of the present invention is described below with respect to FIGS. 17, 18, 19 and 20. FIG. 17 is a schematic block diagram showing an information management system according to the sixth embodiment of the present invention.

In the information management system of FIG. 17, a duplication managing module 210 is further added to the server 2 in the first embodiment, whereas an UIO transmitting module 308, a duplication forming/issuing module 309, and a UIO confirming module 310 are added to the user terminal 3 of the first embodiment.

When a duplication of an UIO is produced in the user terminal 3, predetermined duplication information is notified via the identification module 9 to the duplication managing module 210. The predetermined duplication information contains such information capable of specifying a duplication path and a duplication owner such as a produced duplication number, an object number of a duplication source, a user ID of a duplication former, a user ID of a duplication owner, and a forming date. The duplication managing module 210 requests the information management module 5 to write the duplication information, so that the duplication information is written as a portion of the user information into the user information DB 4. FIG. 18 represents a conceptional diagram of duplication information managed in the user information DB 4. It should be noted that the server 2 may acquire preselected duplication information in accordance with a notification sent from the user terminal 3 which receives a duplication of a UIO.

Also, the duplication managing module 210 transmits duplication information to the user terminal 3 in response to a duplication reference request instructed from the processing module 11 of the user terminal 3. The duplication information may be accessed only by the providing user of the user information that is the source of the UIO duplicated by the above-discussed access control module. Each user can see a duplication history of a UIO related to himself.

A UIO transmitting module 308 transmits a UIO of a user to another user terminal, and transmits information related to the transmission to the server 2. The UIO transmitting module 308 receives a transmission request of a UIO issued from a user in combination with a designation of a UIO to be transmitted and a designation of a transmission destination. When the UIO is designated, while a graphical user interface (GUI) is employed, the visual display of the UIO to be transmitted may be preferably designated by operating a pointing device such as a mouse. The UIO transmitting module 308 compares a user ID described in the UIO to be transmitted with an user ID stored in the storage 13. When the user IDs are made coincident with each other, the UIO transmitting module 308 determines that the UIO of the user himself is transmitted, and thus executes the transmission.

Conversely, when the user ID of the UIO is not made coincident with the user ID of the storage 13, the UIO transmitting module 308 may refuse the transmission, or may notify a duplication issue instruction together with the object number and the transmission destination with a duplication forming/issuing module 309 (described in greater detail below).

When the transmission of the UIO is performed, the UIO transmitting module 308 transmits pre-selected UIO transmission information to the server 2. The predetermined UIO transmission information contains at least the object number, and also information (name of user, user ID etc.) capable of specifying the user of the transmission destination.

The duplication forming/issuing module 309 forms a duplication of a UIO, and transmits the formed duplication to another user terminal and further sends a duplication forming notification to the server. In this embodiment, the duplication forming/issuing module 309 forms a duplication by receiving the notification sent from the UIO transmitting module 308. The duplication forming/issuing module 309 may form a duplication in response to a duplication issuing request sent by the user.

The duplication forming/issuing module 309 reads out a UIO from the storage 13 by using the notified object number as a key, and then forms a duplication of this UIO by adding such information as a duplication number, a user ID of a duplication former, and a duplication forming date to the read UIO. FIG. 19 shows an example of a duplicated UIO. Also, when a duplication of the duplicated UIO is formed, a user ID of a former duplication is newly added while the previous descriptions of the duplication former are maintained such that anyone can recognize duplication.

The duplication forming/issuing module 309 transmits preselected duplication information to the server 2, and also transmits the formed UIO duplication to the designated transmission destination. The preselected duplication information transmitted to the server 2 contains information indicative of a duplication history such as a duplication number, an object number of a duplication source, a former ID of a duplication, a user ID of a duplication issuing destination, and a forming date.

Also, a UIO confirming module 310 is provided in the user terminal 3 in FIG. 17 independent from the duplication forming/issuing module 309. The UIO confirming module 311 determines whether or not the UIO transmitted to the user terminal 3 is a duplication. After this determination is carried out, the transmitted UIO may be stored. The confirmation of the UIO may be carried out determining whether or not predetermined duplication information is contained in the UIO. When the UIO is confirmed by the user, it is preferable to display the determination by using the GUI (graphical user interface) in order that the user can easily determine whether or not the transmitted UIO is the duplication thereof.

If the received UIO is the duplication thereof, then the UIO confirming module 311 notifies predetermined duplication information to the server. The predetermined duplication information contains a duplication forming number, an object number of a duplication source, a former ID of a duplication, a user ID of a duplication owner, a duplication forming date, and the like similar to the above described case.

Figure 20:
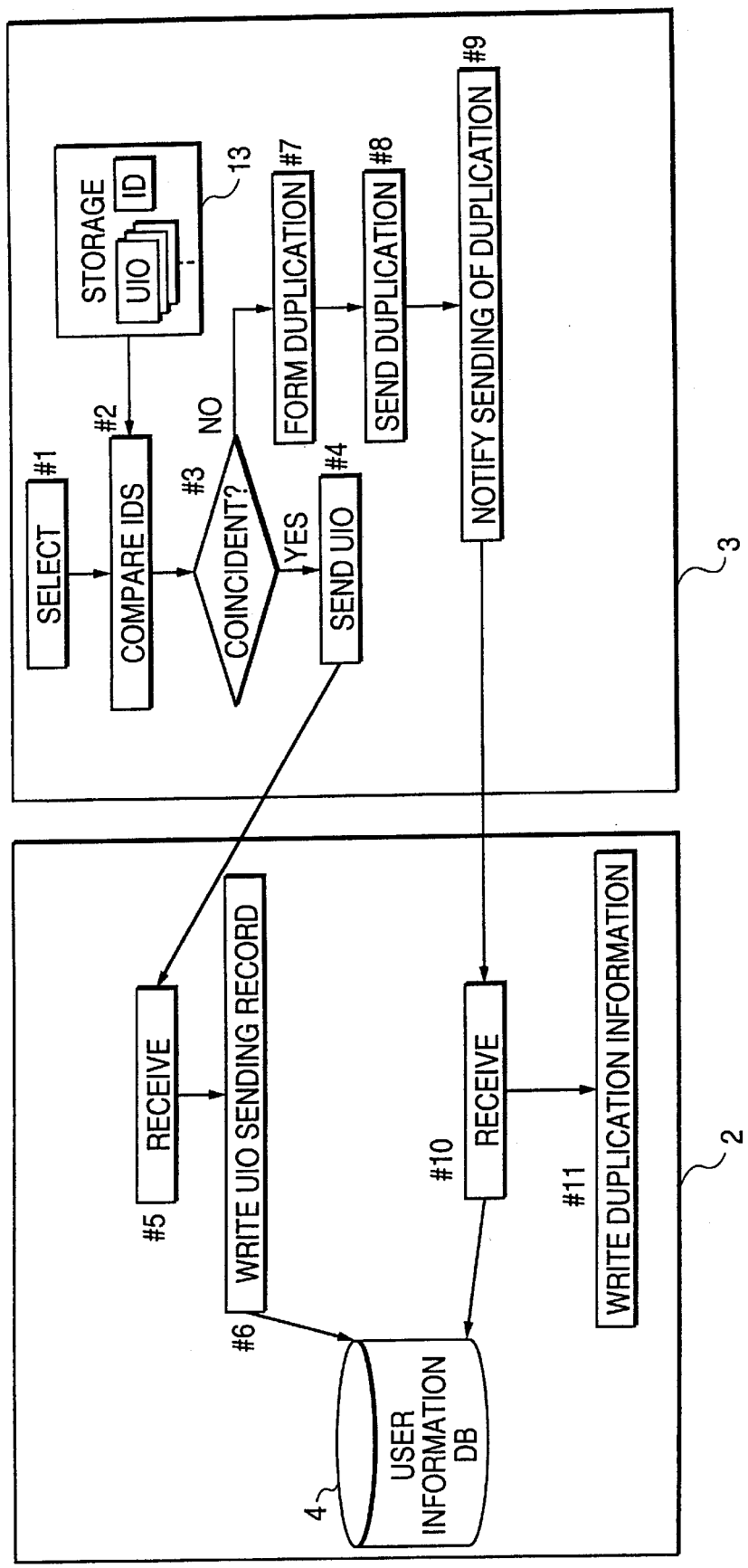
FIG. 20 is a flowchart illustrating a UIO (user information object) transmitting process where an UIO is transmitted from the server to a user terminal in the system depicted in FIG. 17.

FIG. 20 shows an example of a UIO confirmation process and a duplication transmission process.

When a UIO to be transmitted and a transmission destination is selected by a user (#1), the UIO transmitting module 308 reads the subject UIO and the user ID from the storage 13. Then, the UIO transmitting module 308 compares a user ID described in the UIO with a user ID stored in the storage 13 of the user terminal (#2). When both user IDs are made coincident with each other (#3), the UIO transmitting module 308 determines that the UIO is transmitted by the user himself. Then, the UIO transmitting module 308 transmits the UIO to another user terminal, and transmits predetermined UIO transmission information to the server 2 (#4). Conversely, when the user IDs are not coincident with each other, the UIO transmitting module 308 notifies the duplication forming/issuing module 309 by transmitting the duplication forming and the issuing request together with the subject. UIO and the transmission destination.

The UIO transmission information received by the server 2 (#5) is identified by the identification module 9, and thereafter is notified to the information management module 5. In response to the notification, the information management module 5 rewrites the issue history of the transmitted UIO (#6).

When the UIO transmitting module 308 sends a notification to the duplication forming/issuing module 309*a* about the duplication issuing request, the duplication forming/issuing module 309 forms a duplicate of the UIO wherein predetermined information has been added in response to the notification, and then transmits the duplicate of the UIO (#7, #8). Moreover, the duplication forming/issuing module 309 transmits predetermined duplication information to the server 2 (#9).

The server 2 which receives the duplication information (#10) writes the duplication information into the user managing DB 4 by means of the user managing module 5 (#11).

In this sixth embodiment, the UIOs of other users held by the respective user terminals are duplicated and these duplicated UIOs can be distributed to other users by the user storing the UIOs. As a consequence, the friends can be introduced to each other via the network. Moreover, the duplicated UIO is processed by executing a process operation showing that the UIO corresponds to a duplication, so that the unfair use and the confusion of UIOs can be avoided.

Also, the user can check to what extent the UIO related to himself and the duplication thereof is distributed via the network.

Figure 21:
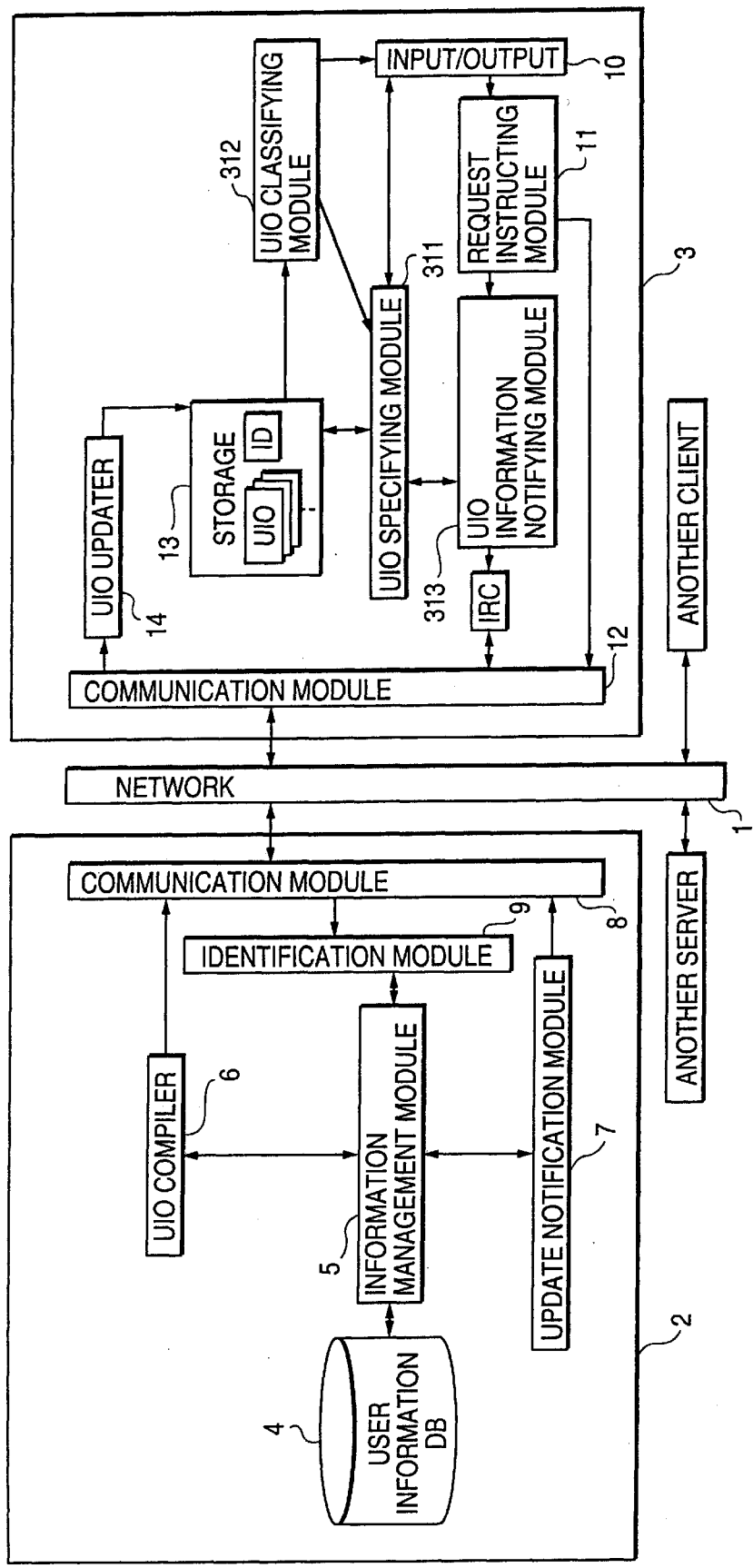
FIG. 21 is a block diagram showing an information management system that includes a server and at least one user terminal which communicate with one another over a network in accordance with a seventh embodiment of the present invention.

A seventh embodiment of the present invention is described below with respect to FIGS. 21, 22, 23, 24, 25 and 26. FIG. 21 is a schematic block diagram for indicating an information management system according to the seventh embodiment of the present invention.

In the information management system in FIG. 21, a UIO specifying module 311; a UIO classifying module 312; and a UIO information notifying module 313 are added to the user terminal 3 of the first embodiment. In the user terminal 3, external application software such as an IRC (Internet Relay Chat services) can be operated.

Figure 22:
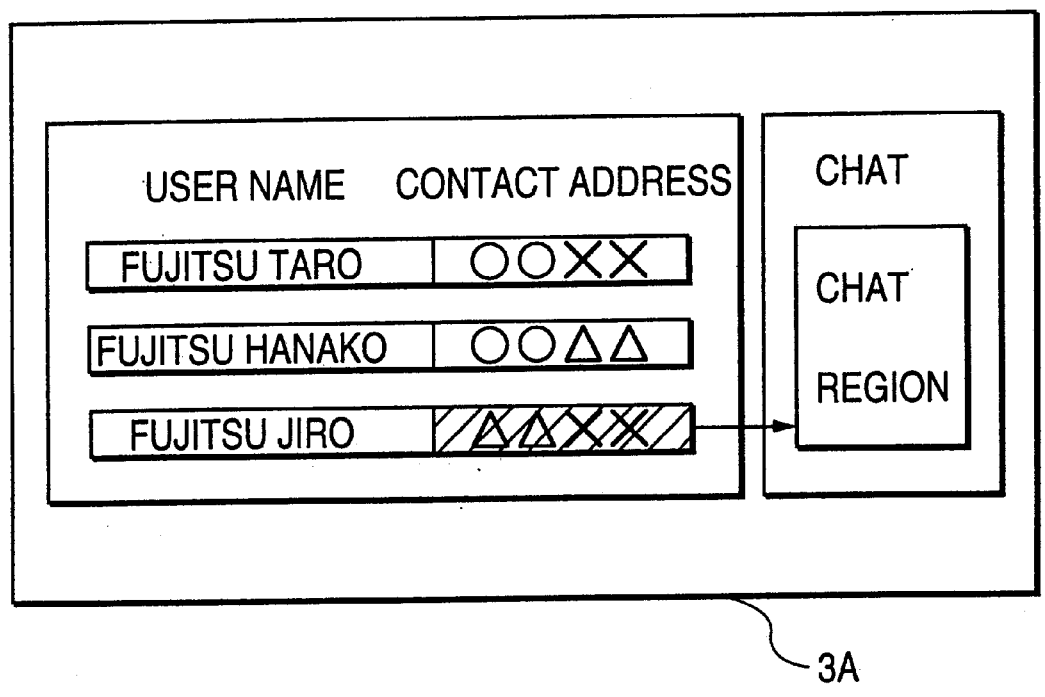
FIG. 22 is a representation of a display screen used with user information notification where an external software application is accessed by the user terminal depicted in FIG. 21.

The UIO specifying module 311 displays a UIO stored in the storage 13 on a screen, and acquires the displayed UIO and an attribute value of the UIO in accordance with selection by a user. FIG. 22 represents an example of a screen on which a content described in a UIO is displayed by the UIO specifying module 311. In FIG. 22, the respective attribute values of the UIO are arranged and displayed in such a manner that these attribute values are not overlapped with each other within a window. Also, UIOs are successively displayed from a top position, and a UIO that cannot be arranged within this window is not displayed. For example, when a communication destination of "FUJITSU JIRO" is selected by means of an input device such as a mouse in the user terminal 3A, the UIO specifying module 311 saves an attribute value thereof into a buffer. The saved attribute value is notified to another processing module in response to a request.

Figure 24:
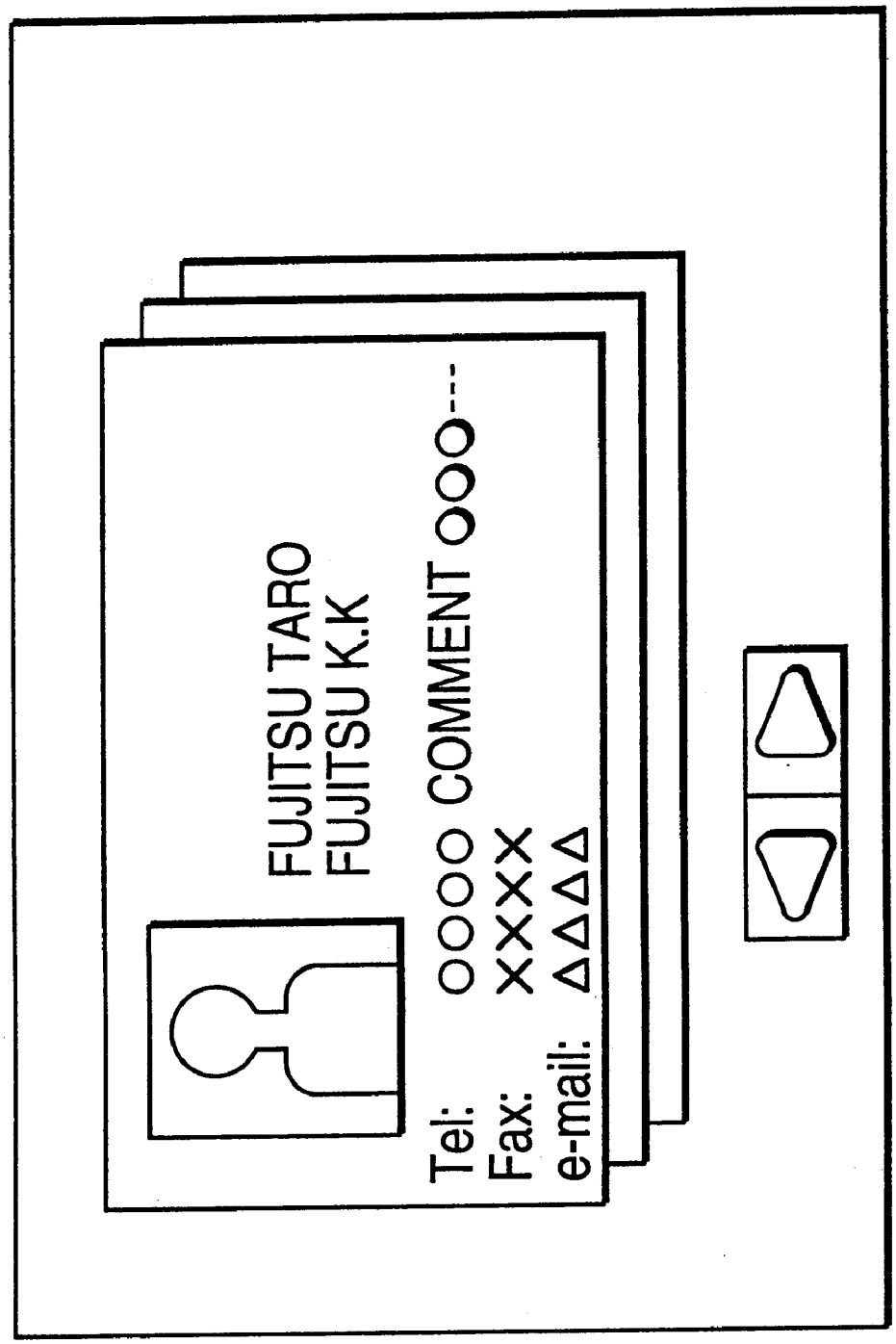
FIG. 24 is a representation of a UIO (user information object) as it appears on a display screen of the user terminal depicted in FIG. 21.

FIG. 24 shows another example of a terminal screen on which a content described in a UIO is displayed by the UIO specifying module 311. The respective attributes of the user information are displayed on the screen in the form of the calling card by which the user can readily discriminate the respective user information. Also, since these attributes are displayed as the electronic visiting cards, these attributes can be readily selected, deleted, and copied by way of the window operations on the screen.

Figure 25:
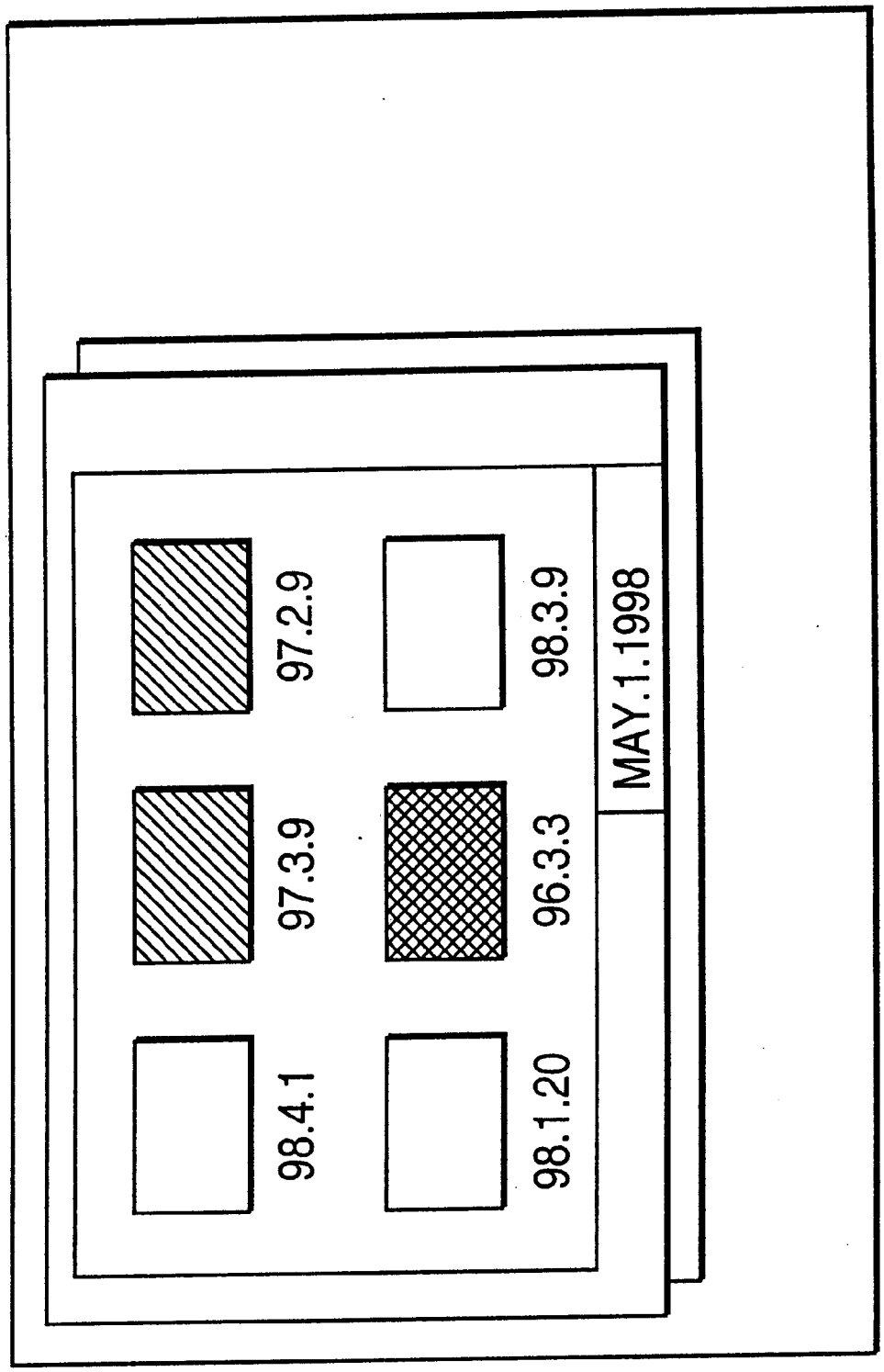
FIG. 25 is a representation of another UIO (user information object) as it appears on a display screen of the user terminal depicted in FIG. 21.

The UIO specifying module 311 may change a display of a UIO in accordance with a description content of this UIO. For instance, as indicated in FIG. 25, while using a point of time in the user terminal 3 as a reference, in the case that a forming date of each of the UIOs is dated before predetermined time, the display portions of the relevant UIOs are overlapping. In addition, older the UIO are displayed with an overlapping ratio of the mesh display such that the older the UIO, the more dense the mesh, by which the user may visually discriminate the outdated degrees of the UIOs. When the display of the UIO is changed in accordance with the description content of the UIO, a portion of the attribute values of the UIO, which constitutes the reference thereof, may be simultaneously displayed, for example, the UIO forming date in the previous example.

The UIO classifying module 312 classifies the UIOs stored in the storage 13 of the user terminal 3 by using a classification reference entered by a user (i.e. by date, size, group, etc.), and then alert the UIO specifying module 311 of the classification of the UIOs.

For example, the following classification method may be employed. The user may classify UIOs by the keyword entered by the user that caused the UIOs to be selected for transmission. Such a keyword would be in the description content of the UIO. Also, while classification references are previously set, the UIOs may be classified by designating the classification reference. As an example of this classification reference, the following items may be employed, e.g., "male", "female", "sharing the same hobby", "same generation", "same birthplace", "having common friend". Also, a plurality of classification references may be designated.

Figure 26:
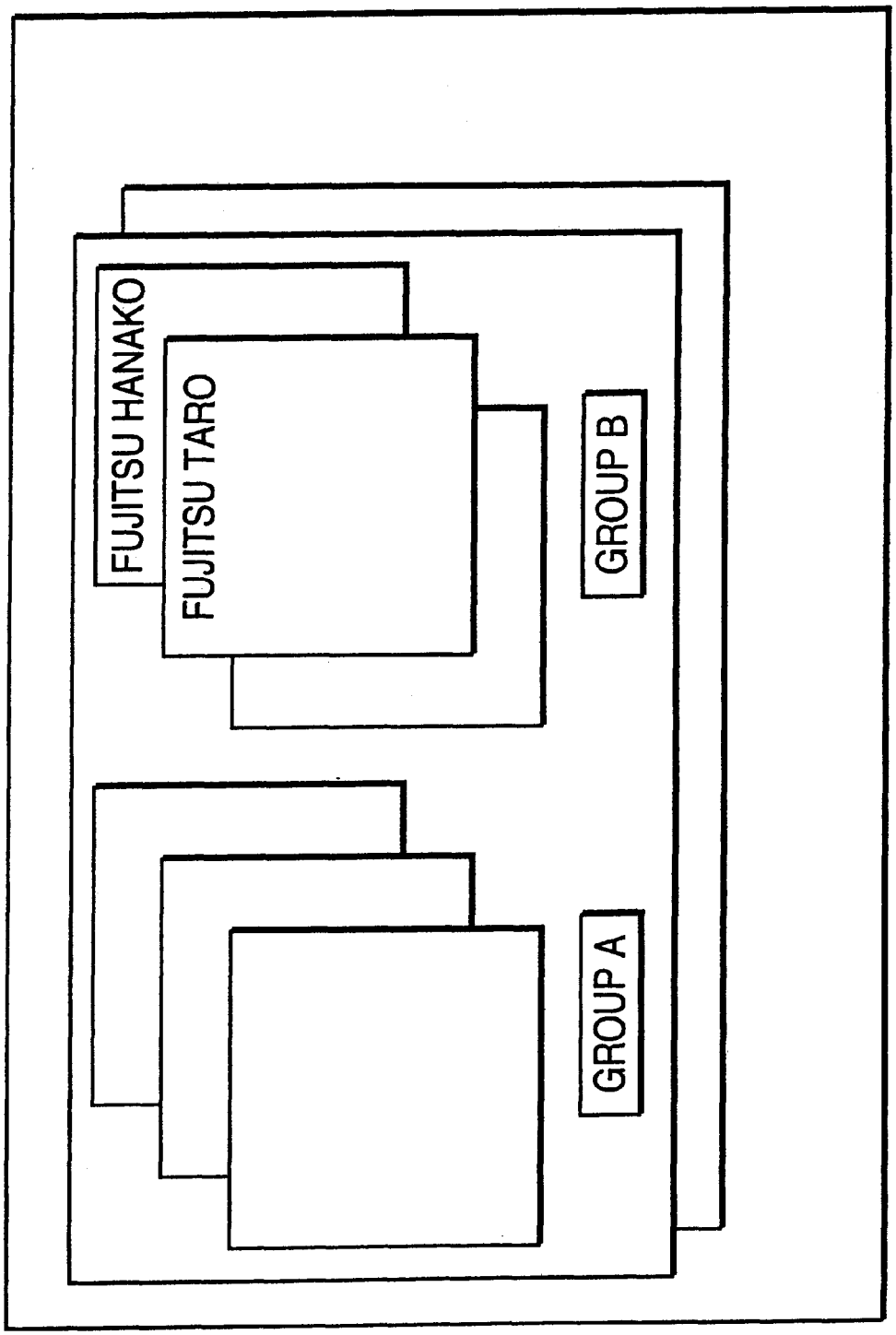
FIG. 26 is a representation of yet another UIO (user information object) as it appears on a display screen of the user terminal depicted in FIG. 21.

After the classification process is accomplished, the UIO classifying module 312 notifies the classification result to the UIO specifying module 311. As indicated in FIG. 26, the UIOs contained in a group are arranged in such a way that these UIOs are slightly shifted and overlapped with each other. These overlapped UIOs are displayed on the screen in combination with the classification references of the respective groups.

In the present invention, an IRC (Internet Relay Chat) may be accessed as the external application software and is executable from the user terminal 3. The UIO information notifying module 313 notifies an attribute value of an UIO specified by the UIO specifying module 311 to the IRC application software in response to the notification request of the attribute value. An attribute value suitable for the notification may be, for example, a contact address (channel name of IRC and portable telephone number etc.) described in UIO may be used. Also, a contact address of another user supplied in an UIO may be used.

For example, as shown in FIG. 22, when a user wants to make contact with the contact address in an UIO, the UIO information notifying module 313 receives the attribute value from the UIO specifying module 11 and then supplies the attribute value to the IRC application software. To receive/supply contact address information, a common memory is employed for the IRC application software in the user terminal 3 and the information management system. As a result, for example, an IRC client that receives a channel of the IRC can request a specific communication server to which a chat client thereof is connected to execute a communication starting process.

Figure 23:
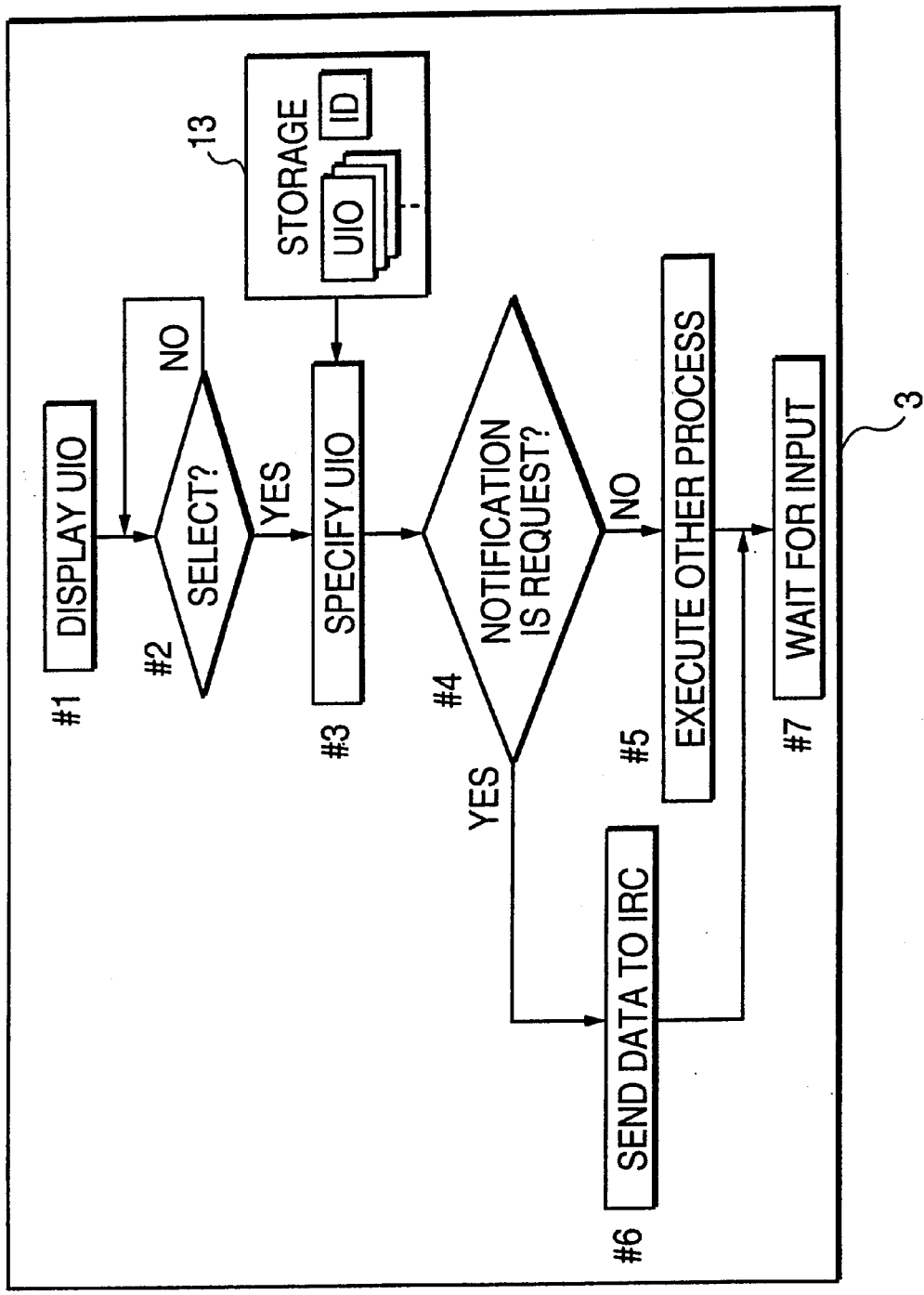
FIG. 23 is a block diagram showing a user information notifying process with respect to accessing the external application software, the process being performed in the system depicted in FIG. 21.

FIG. 23 shows an example of a user information notifying process by the UIO information notifying module 313.

When the attribute value of the UIO, for example, the contact address information displayed on the screen is selected (#1, #2), the UIO specifying module 311 stores an attribute value corresponding to the item of the selected UIO into a buffer (#3). Next, the read attribute value is processed in accordance with the required process (#4).

In such a case that another process operation other than the notification request to the IRC client is requested, the attribute value is retrieved and transmitted to a processing module for executing another process operation (#5). When the notification request process to the IRC client is requested, the read attribute value is written into memory for the IRC application software by the UIO information notifying module 313 (#6), and the UIO information notifying module 313 is returned to a condition where the UIO information notifying module 313 waits for the input from a user, or the transmission sent from the server 2 (#7).

In accordance with the seventh embodiment the list is displayed while the display content is changed in accordance with the description content of the user information object. As a consequence, a user can visually discriminate the user information, and can readily designate the UIO. Also, the description contents of the UIOs held in the user terminal are classified into the various groups in response to the designations of the user, and the output formats are modified, for instance, to display on the classified group basis. By such modification, the visibility by the user can be improved.

Furthermore, the communication with a former of a UIO displayed on the screen, by using an external application software can be smoothly commenced.

Figure 27:
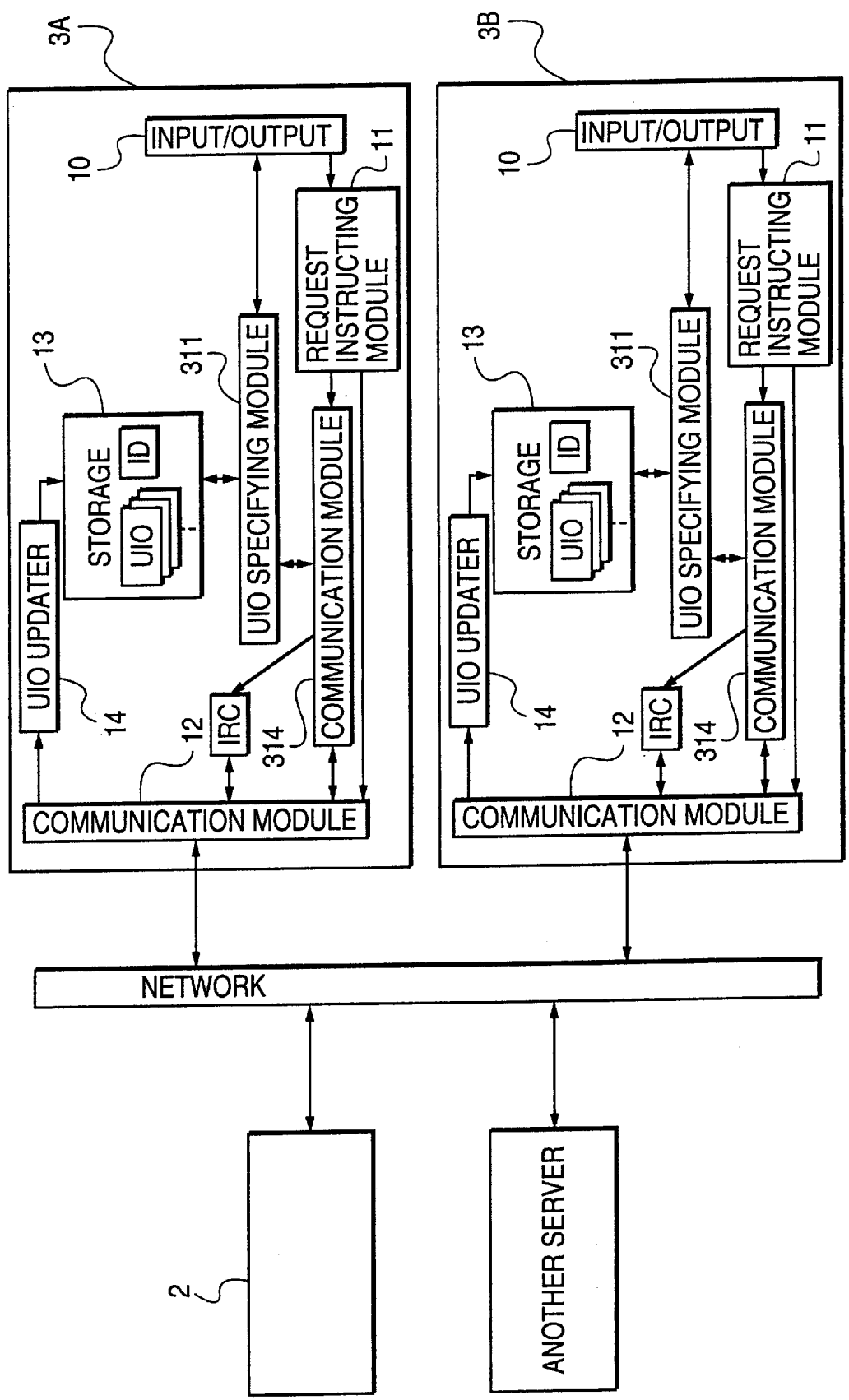
FIG. 27 is a block diagram showing an information management system that includes a server and at least two user terminals which communicate with one another over a network in accordance with a eighth embodiment of the present invention.
Figure 28:
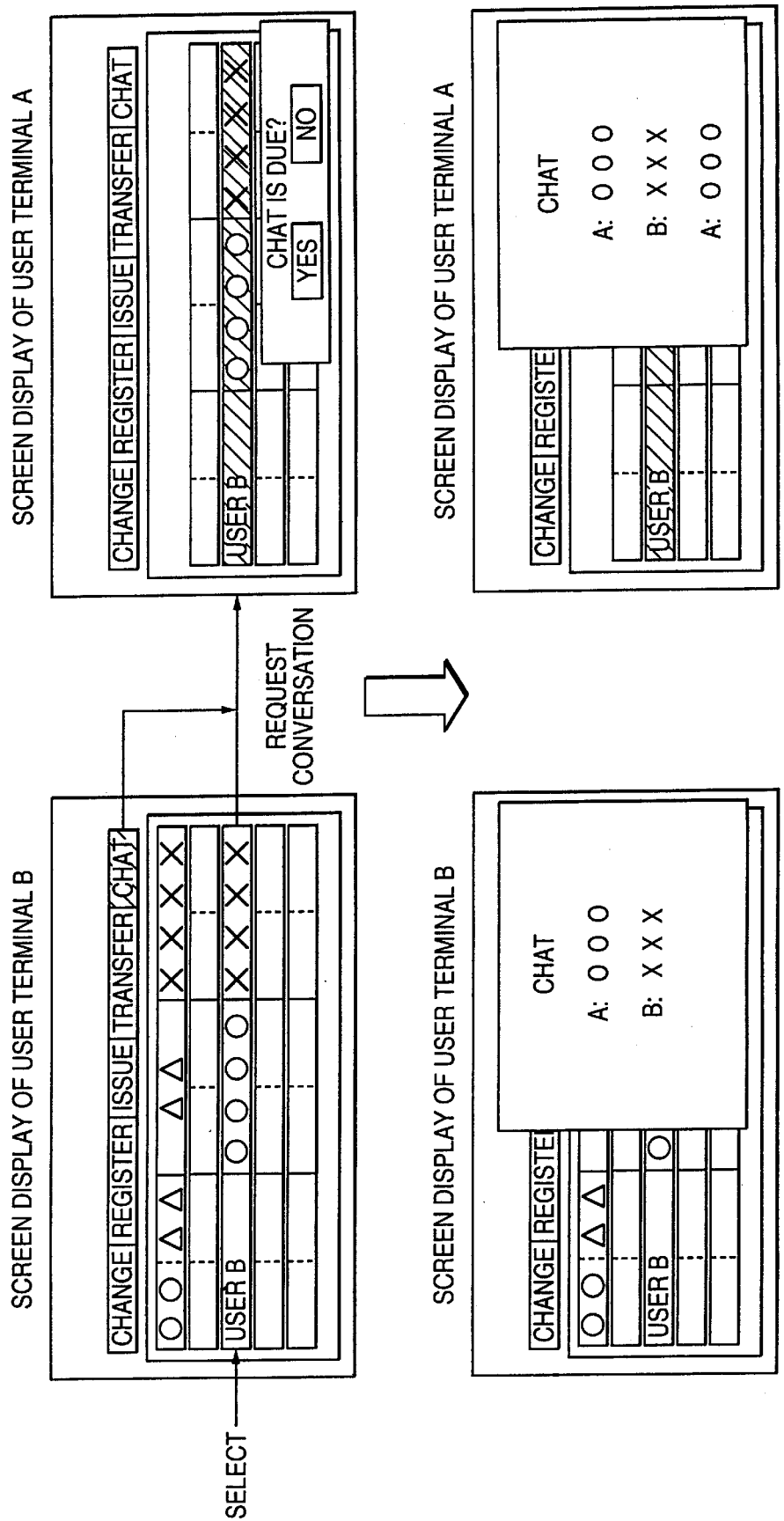
FIG. 28 is a representation of example display screens displayed on the user terminals depicted in FIG. 27, the display screens being used to respond to a communication request.
Figure 29:
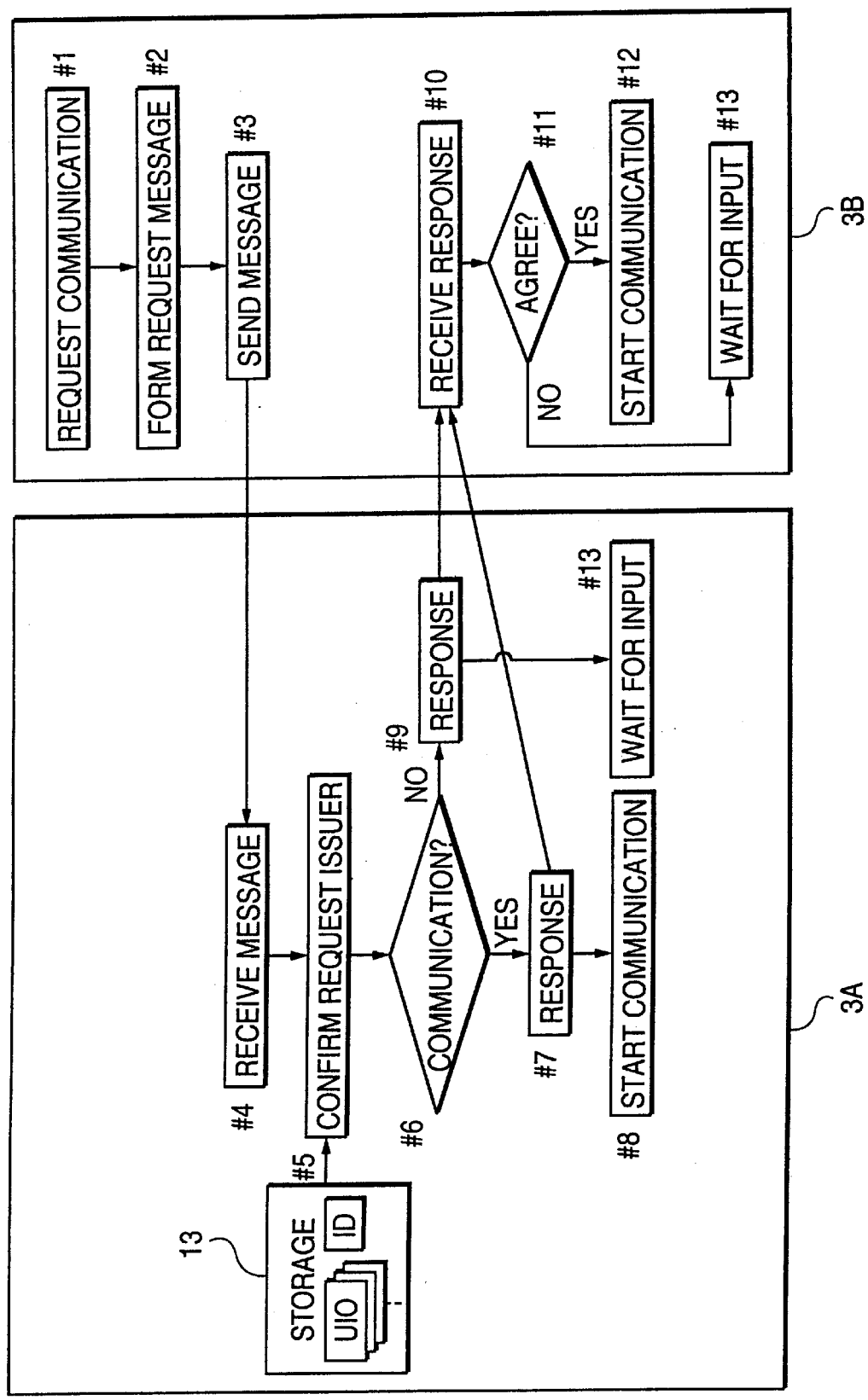
FIG. 29 is a flowchart illustrating a communication confirming process flow in the system depicted in FIG. 27, whereby at least one of the user terminals accesses external application software.

An eighth embodiment of the present invention is depicted in FIGS. 27, 28 and 29. FIG. 27 is a schematic block diagram showing an information managing/communication apparatus according to the eighth embodiment of the present invention.

In the information management system of FIG. 27, a communication module 314 is further added to the user terminal 3 in the first embodiment. The user terminal 3 includes external application software operated on the Internet, and also has the UIO specifying module 311 of the seventh embodiment.

The communication module 314 receives a communication request to another user terminal, and forms a communication request message containing a user ID, and then transmits the formed communication request message to the designated user terminal. Also, the communication module 314 receives a response to the transmitted request, and executes a process operation to the external application software in response to the response.

Both the communication request and the response to the communication request may be preferably made by displaying the UIO on the screen. Furthermore, the communication module 314 compares a user ID contained in a communication request received from another user terminal with the user ID of the UIO stored in the storage 13. Then, the communication module 314 outputs such a UIO whose user IDs are made coincident with each other to the output module 10. When colors of a frame and a background of a UIO of a communication request source are varied, or flickered, it is possible to easily recognize who is the communication request person.

When the UIO of the communication request source is clicked, the communication module 314 acquires a communication address of a request source from the UIO specifying module 311 to issue a communication start command to the external application software, and also transmits a response of the communication start command to the user terminal of the communication request source. In the case that a response of a communication rejection is entered, this communication rejection response is sent.

FIG. 28 represents an example of a display screen for displaying two cases, namely a condition before executing the communication start process, and another condition after executing the communication start process when the communication request is issued from the user terminal 3B to the user terminal 3A.

FIG. 29 represents an example of a communication confirming process operation by the communication module 314.

It is now assumed that a communication can be established by way of the IRC between the terminal 3A of the user A and the terminal 3B of the user B.

In the user terminal 3B, when the UIO of the user A is selected from the UIOs displayed on the screen, and a communication request is entered (#1), the communication module 314 forms a communication request message containing the user ID of the user B (#2), and sends this communication request message to the user terminal 3A to wait for a reception of a response (#3).

On the other hand, the user terminal 3A receives the communication request message issued from the user terminal 3B (#4). The communication module 314 reads the user ID of the user B from the received communication request message, and notifies the UIO specifying module 311 to display the UIO of the user B on the screen in the reverse mode (#5). Next, the communication module 314 waits for an input made by the user A and confirms as to whether or not the communication is made with the user B (#6).

When the user A agrees to establish such a communication by clicking the UIO of the user B, the communication module 314 transmits an agreement response to the user terminal 3B (#7), and then receives an IRC user identification of the user B from the UIO specifying module 311 to thereby request the IRC application software to execute the communication start process (#8). When the communication rejection response is entered, the communication module 314 sends this rejection response to the user terminal 3B (#9), and is brought into such a waiting stage when the communication is rejected, in which the communication module 314 waits for an input from the user B, or the reception of data sent from the server 2 (#13).

The communication module 314 of the user terminal 3B which receives the response (#10) determines whether or not the response sent from the user A agrees to communicate (#11). When the communication request is accepted, the communication module 314 receives the IRC user identification of the user A from the UIO specifying module 311, and then requests the IRC application software to execute the communication start process (#12). When the communication request is refused, this communication module 314 is returned to the input waiting condition from the user B, and the data waiting condition from the server 2 (#13).

In the eighth embodiment, the request for starting the communication issued from other user can be visually confirmed on the screen of the user terminal. Also, the communication with other user can be smoothly commenced by employing the cooperation mechanism with the network application software.

Figure 30:
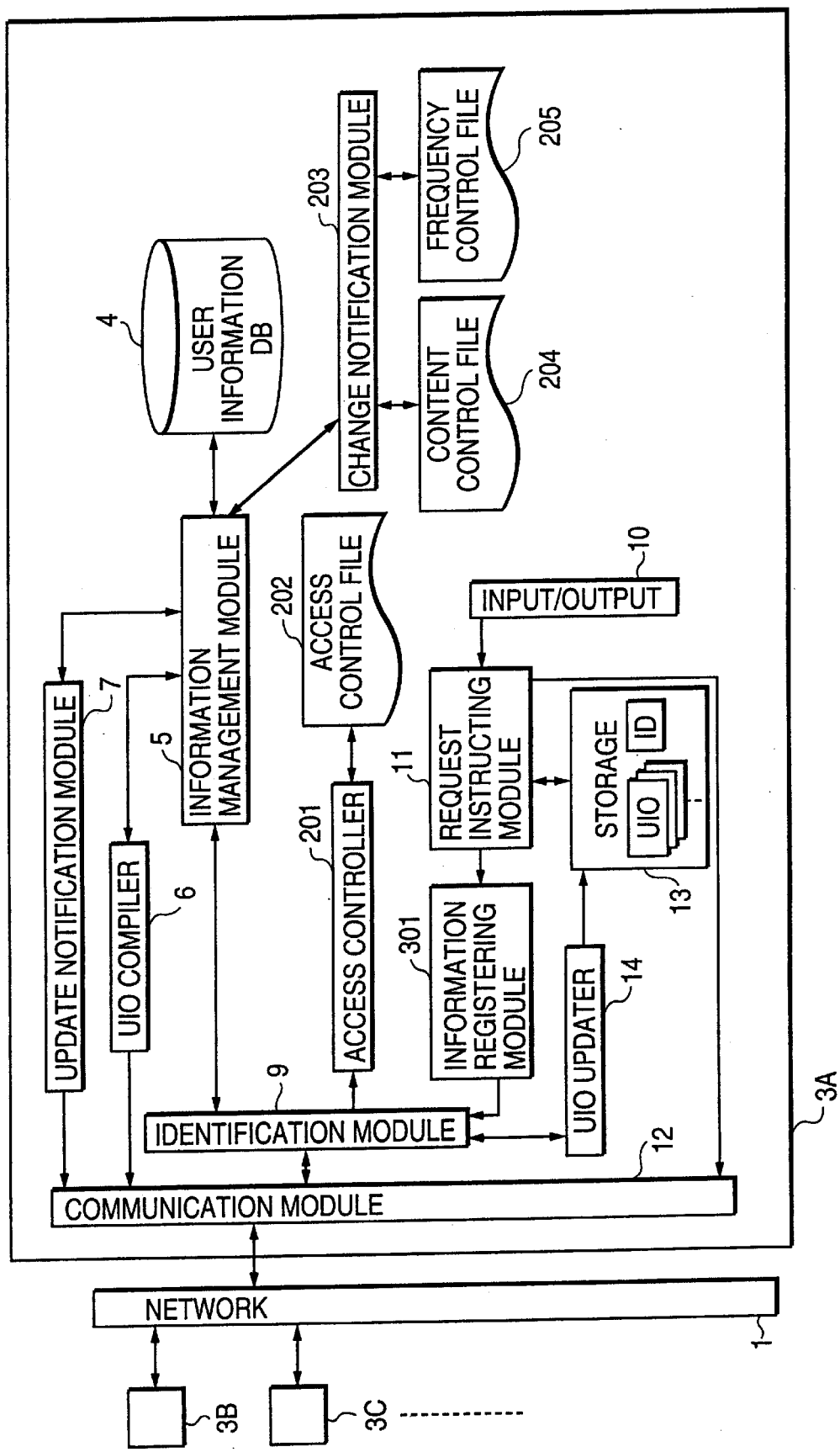
FIG. 30 is a block diagram showing an information management system that includes a server and at least one user terminal which communicate with one another over a network in accordance with a ninth embodiment of the present invention.

A ninth embodiment of the present invention is depicted in FIG. 30. FIG. 30 is a schematic block diagram showing an information management system according to the ninth embodiment of the present invention.

In FIG. 30, the information management system is provided in a user terminal, and each of the user terminals separately manages user information of other users. In this case, the user information of other users acquired must be stored in the respective user terminals in a certain format. As these formats, the following cases are conceived: (a). The user information corresponding to a specific user and user information of other users are each saved in all of the respective, connected user terminals. (b). Each of the user terminals saves user information and accesses a directory server on the network, and the respective user terminals acquire the user information of other users from other user terminals. (c). Each of the user terminals saves their own user information and directory information transferred on the network and each of the user terminals accesses other user terminals to acquire the user information (no server).

The information managing apparatus shown in FIG. 30 includes portions of the above-explained first, second, and third embodiments. However, the information managing apparatus of the present invention may be realized by eliminating a server per se and using a user terminal as a server. Any or all of the features of above-described previous embodiments may be incorporated into the ninth embodiment.

Further, all of the features of the first eight embodiments described above may be combined together in an information exchanging system.

In accordance with the present invention, the user information is handled as the data movable via the network, and this user information is produced by acquiring such user information from users belonging to a group, the contact address, the present information, the present conditions and so on. Since the user information as the user information object sent to the user terminal is changed so as to be made coincident with the latest user information sent later, the contradictory between the information saved on the user side and the actual information can be avoided.

Since the contact address information and the like are sequentially updated, the communication with the counter party can be smoothly commenced. Also, the content of the update notification and the communication frequency such as the action information can be changed in accordance with the counter party. As a result, the relationship within the network can be smoothly controlled so that the privacy of the network users can be guarded.

What is claimed is:

1. An information management system including a server connected via a network to a plurality of user terminals, the system comprising:

processing means for issuing a request to receive user information in each of said user terminals;

user information storage means for storing the user information in said server, the user information including information about respective users utilizing said user terminals;

user information management means in said server for managing the contents of said user information storage means in response to requests from said processing means in said user terminal;

object compiling means in said server for issuing a user information object from corresponding user information in response to said requests from said processing means;

communication means in said server for transmitting issued user information objects to corresponding ones of said user terminals in response to said requests from said corresponding one of said user terminals;

update notification means in said server, said update notification means being configured to detect changes in the user information stored in said user information storage means, said update notification means further configured for notifying detected changes to corresponding ones of said user terminals where said corresponding ones of said user terminals previously received user information;

object storing means in said user terminals for storing the user information object sent from said server; and object updating means in said user terminals for changing the content of said user information object stored in said object storage means in response to notification from said update notification means.

2. The information management system as set forth in claim 1, further comprising:

duplication management means in said user terminal for forming a duplication object in which predetermined duplication information is added to the user information object stored in said object storage means and for issuing said formed duplication object to said server via the. network; and duplication notifying means for notifying pre-selected duplication information indicative of a duplication history to said user information storage means in said server in response to issuing said duplication object.

3. The information management system as set forth in claim 2, further comprising:

duplication confirming means for confirming whether or not an issued user information object is a duplication; and duplication notifying means for notifying predetermined duplication information indicative of a duplication history to said user information storage means in a case where said duplication confirming means confirms that said issued user information object is a duplication.

4. The information management system as set forth in claim 3 wherein:

said predetermined duplication information contains information for specifying at least said duplication object, and a transmission destination of said duplication object.

5. The information management system as set forth in claim 1 wherein:

the user information in said user information storage means contains notification control information used to control update notification; and said information management system further comprises:

means for controlling update notification by said update notification means whereby in response to detection of changes in the user information said notification control information is used to identify ones of said user terminals that have received user information objects that include information corresponding to changed portions of user information data.

6. The information management system as set forth in claim 5 wherein:

said notification control information also includes information related to a change notification destination and timing of the change notification.

7. The information management system as set forth in claim 1 wherein:

the user information includes predetermined access control information used by said user information management means to determine access to predetermined portions the user information by said user terminals; and said information management system further comprises access control means for controlling arrangement of said user information management means based on said access control information.

8. The information management system as set forth in claim 1, further comprising:

information adding means in said user terminals for adding and changing user information corresponding to transmitted user information object.

9. The information management system as set forth in claim 1 wherein:

the user information in said user information storage means includes notification control information used by said update notification means, said notification control information including a content control file and a frequency control file, said content control file indicating content of previously transmitted user information objects and said frequency control file including information regarding the frequency updates are required; and said information management system is further comprised of:

change notification means which operates with said update notification means, said change notification means accessing said content control file and said frequency control file in response to operation of said update notification module.

10. The information management system as set forth in claim 1, further comprising:

change notification means in said user terminals for outputting information to a user indicating that there is an update to a previously received user information object stored in said object storage means.

11. The information management system as set forth in claim 1 wherein:

the user information contains discrimination information used to determine invalidity of user information; and said information management system is further comprised of:

invalidity detecting means in said user terminal for detecting invalidity of an user information object stored in said object storage means; and invalidity notifying means for outputting a detection result of said invalidity detecting means.

12. The information management system as set forth in claim 1, further comprising:

information acquiring means in said server, said information acquiring means being configured to monitor said user terminals and acquire dynamic information concerning said user terminals, said information acquiring means further configured to notify said user information management means of changes in the acquired dynamic information.

13. The information management system as set forth in claim 1, further comprising:

exchange instruction means in each of said user terminals, said exchange instruction means being configured for specifying others of said user terminals in a request to exchange user information objects, said exchange instruction means further being configured to respond to requests from other user terminals allowing or declining an exchange of user information objects; and exchange confirming means in said server configured for instructing said object compiling means to issue and transmit the compiled user information object to said other user terminals in response to an allowing response from said other user terminals.

14. The information management system as set forth in claim 1, further comprising:

comparing means in said server and said user terminals for comparing contents of a user information object stored in said object storage means with a content of user information stored in said user information storage means.

15. The information management system as set forth in claim 1, further comprising:

first digest forming means in said user terminals for forming a digest of user information objects stored in said object storage means, such that said formed digest is transmittable to others of said user terminals;

second digest forming means in said server specifying a specified user from received digests to thereby form another digest of user information related to said specified user stored in said user information storage. means; and digest comparing means for comparing the digest formed by said first digest forming means with the digest formed by said second digest forming means.

16. The information management system as set forth in claim 1, further comprising:

duplication management means in said user terminals for forming a duplication of the user information object in which predetermined duplication information containing duplication source information for specifying at least a duplication is added to the user information object stored in said object storage means, and for issuing said duplication to said server via the network.

17. The information management system as set forth in claim 1, further comprising:

object requesting means in said user terminal for requesting transmission of at least one user information object to another of said user terminals; and identification means being configured to identify a user requesting transmission of the requested user information object such that only requests from an identified user corresponding to the user information object cause user information objects to be issued.

18. The information management system as set forth in claim 1, further comprising:

replacing means for comparing previously transmitted user information objects with the user information objects previously stored in said object storage means, and for replacing user objects stored within said object storage means in response to results of the comparing.

19. The information management system as set forth in claim 1, further comprising:

display means for visually displaying a contents of the user information objects.

20. The information management system as set forth in claim 19 wherein:

said display means is configured to change a display format such that contents of the user information object may be altered in appearance and organization.

21. The information management system as set forth in claim 1, further comprising:

communication means in each of said user terminals, said user terminals being configured to execute other network application software using said communication means, and said user terminals being configured for entering a portion of information contained in one of the user information objects into said network application software.

22. The information management system as set forth in claim 1, further comprising:

communication requesting means in each of said user terminals configured to execute network application software and issue a communication request to other of said user terminals requesting said other of said user terminals to execute said network application software; and communication confirming means in each of said user terminals for responding to said request to execute said network application software.

23. An information exchanging method for exchanging information between a plurality of user terminals, where the plurality of user terminals includes at least a first and a second user terminal, where the information relates to corresponding users at corresponding user terminals, where the information is stored on the respective user terminals and the user terminals being connected to each other via a network, the method comprising the steps of:

transmitting user information to a first user terminal, the transmitted user information being based upon user information stored in a second user terminal, the transmitted user information being transmitted from the second user terminal;

providing the second user terminal with transmission information relating to the transmitted user information transmitted to the first user terminal, the transmission information including a transmission destination corresponding to the first user terminal;

sensing in the second user terminal changes in portions of the user information stored therein, and further determining if sensed changes in the portions of the user information require updating of corresponding portions of user information previously transmitted to the first user terminal;

notifying the first user terminal of changes in the portions of the user information; and transmitting changes portions of the user information to the first user terminal in response to sensing and determining changes in the portions of the user information.

24. The information exchanging method as set forth in claim 23, said method further comprising the steps of:

determining access level information related to the user information saved in the second user terminal, the access level information having determined levels of access to the user information including the transmitted user information in the first user terminal; and determining which portions of changed user information are to be transmitted to the first user terminal, and determine timing of transmission of changed user information based upon the access level information.

25. The information exchanging method as set forth in claim 23 wherein:

the transmitted user information is a user information object that is in the form of an electronic calling card corresponding to a user utilizing the second user terminal.

26. A information exchanging system for exchanging information between a plurality of user terminals, where the plurality of user terminals includes at least a first and a second user terminal, where the information relates to corresponding users at corresponding user terminals, where the information is stored on the respective user terminals and the user terminals are connected to each other via a network, the system comprising:

means for transmitting user information to a first user terminal, the transmitted user information being based upon user information stored in a second user terminal, the transmitted user information being transmitted from the second user terminal;

means for providing the second user terminal with transmission information relating to the transmitted user information transmitted to the first user terminal, the transmission information including a transmission destination corresponding to the first user terminal;

means for sensing in the second user terminal changes in portions of the user information stored therein, and further determining if sensed changes in the portions of the user information require updating of corresponding portions of user information previously transmitted to the first user terminal;

means for notifying the first user terminal of changes in the portions of the user information; and means transmitting changes portions of the user information to the first user terminal in response to sensing and determining changes in the portions of the user information.

27. The information exchanging system as set forth in claim 26, further comprising:

means for determining access level information related to the user information saved in the second user terminal, the access level information having determined levels of access to the user information including the transmitted user information in the first user terminal; and means for determining which portions of changed user information are to be transmitted to the first user terminal, and determine timing of transmission of changed user information based upon the access level information.

28. The information exchanging system as set forth in claim 26 wherein:

said transmitted user information is a user information object that is in the form of an electronic calling card corresponding to a user utilizing the second user terminal.

29. An information management system including a server for managing user information related to users on a network, and at least one user terminal connected via the network to said server, for communicating said user information, wherein:

said server comprises:

user information storage means for storing said user information;

user information management means for maintaining contents-of said user information storage means in response to requests from said user terminals related to user information;

object compiling means for forming a user information object based upon said user information in response to requests from said user terminals, said object compiling means further configured for issuing and transmitting said user information object to selected ones of said user terminals; and update notification means for detecting a change in said user information stored in said user information storage means, and for notifying said change to corresponding ones of said user terminals which previously received a corresponding user information object; and wherein:

said user terminal comprises:

request processing means for issuing a request to said server for transmission of a user information object to other of said user terminals;

object storage means for storing user information objects received from said server;

output means for outputting stored user information objects for a user to access; and object updating means for updating portions of the contents of said user information object stored in said object storage means in response to update notification received from said server.

30. An information managing apparatus connected via a network to a plurality of user terminals, for managing information related to a user and communicated among said plurality of user terminals, the information managing apparatus comprising:

user information storage means for storing said user information;

user information management means for arranging contents of said user information storage means in response to a request related to user information and issued from one of said user terminals;

object compiling means for forming a user information object based upon said user information in response to the request related to said user information and issued from said user terminal, said object compiler means further configured to transmit said formed user information object to said user terminal; and update notification means for detecting a change in said user information stored in said user information storage means, and for notifying said change to respective ones of said user terminals which store the outdated user information.

31. An information communicating apparatus connected via a network to a server for managing information related to users on said network, for communicating the user information, comprising:

request-processing means for issuing a request related to said user information to said server;

object storage means for storing a user information object transmitted from said server;

output means for outputting said stored user information object; and object updating means for updating contents of said user information object stored in said object storage means in response to change notification of the user information transmitted from said server.

32. A computer readable recording medium for recording thereon an information managing/communicating program, used in a user terminal connected via a network to other user terminals, for managing/communicating information related to users on the network, said information managing/communicating program executing:

A) entering user information from a user terminal;

B) storing said user information;

C) arranging and managing said user information such that contents of stored user information is in accordance with entered instructions relating to said user information.;

D) an object compiling step for forming a user information object which describes said user information in accordance with a request from said user terminal for issuance of the user information object to a selected other user terminal;

E) an update notification step for detecting changes in stored user information, and for notifying recognition of said change to said other user terminal which previously received a corresponding user information object;

F) an object storing step for storing a user information objects sent from other user terminals;

G) an output step for outputting said stored user information object; and

H) an object updating step for changing the content of said stored user information object in response to receipt of said update notification sent from said other user terminal.

33. A computer readable recording medium for recording thereon an information managing program used in a server connected via a network to a plurality of user terminals, for managing information related to users on the network, said information managing program executing:

A) storing user information;

B) managing and arranging contents of stored user information in response to instructions from a corresponding-user terminal;

C) compiling-an user information object based upon said user information in response to instructions from a user at said corresponding user terminal, and for issuing said formed user information object to other user terminals; and D) detecting changes in said stored user information and transmitting an update notification said other user terminals in response to detection changes.

34. A computer readable recording medium for recording thereon an information communicating program used in user terminals connected via a network to a server for managing information related to users on the network, said information communicating program executing;

A) issuing a request for input of user information to said server;

B) storing an user information object sent from said server;

C) out putting said stored user information object; and

D) updating the content of said stored user information object in response to an update notification from the server.

* * * * *

UNITED STATES PATENT AND TRADEMARK OFFICE
CERTIFICATE OF CORRECTION

PATENT NO. : 6,205,478 B1
DATED : March 20, 2001
INVENTOR(S) : Sugano et al.

It is certified that error appears in the above-identified patent and that said Letters Patent is hereby corrected as shown below:

Abstract,
Change "device" to -- means -- all occurrances.

Column 39,
Line 21, delete [.]

Column 41,
Line 20, delete [.]

Column 43,
Line 54, delete [-]

Column 44,
Line 41, delete [-]

Column 45,
Line 25, delete [-]

Column 46,
Line 1, delete [-]
Line 20, change "out putting" to -- outputting --.

Signed and Sealed this

Sixth Day of November, 2001

Attest:

NICHOLAS P. GODICI
*Attesting Officer*   *Acting Director of the United States Patent and Trademark Office*